US011322942B2

(12) United States Patent
Orban et al.

(10) Patent No.: US 11,322,942 B2
(45) Date of Patent: May 3, 2022

(54) ELECTRICAL POWER GENERATION AND DISTRIBUTION SYSTEM WITH POWER RECOVERY AND REGENERATION

(71) Applicant: Schlumberger Technology Corporation, Sugar Land, TX (US)

(72) Inventors: Jacques Orban, Katy, TX (US); Kurt Held, Houston, TX (US); Jean-Christophe Priser, Katy, TX (US); Nick Paul Krippner, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 891 days.

(21) Appl. No.: 15/782,420

(22) Filed: Oct. 12, 2017

(65) Prior Publication Data

US 2019/0115758 A1   Apr. 18, 2019

(51) Int. Cl.
| | | |
|---|---|---|
| H02J 3/30 | (2006.01) |
| E21B 3/02 | (2006.01) |
| H02J 9/06 | (2006.01) |
| F03B 13/02 | (2006.01) |
| H02J 3/32 | (2006.01) |
| H02K 7/18 | (2006.01) |
| H02J 7/00 | (2006.01) |

(52) U.S. Cl.
CPC ............. *H02J 3/30* (2013.01); *E21B 3/02* (2013.01); *F03B 13/02* (2013.01); *H02J 3/32* (2013.01); *H02J 7/0024* (2013.01); *H02J 9/066* (2013.01); *H02K 7/18* (2013.01)

(58) Field of Classification Search
CPC ..... E21B 3/02; F03B 13/02; H02J 3/30; H02J 3/32; H02J 7/0024; H02J 9/066; H02K 7/18
USPC ......................................................... 307/26
See application file for complete search history.

(56) References Cited

U.S. PATENT DOCUMENTS

| | | | |
|---|---|---|---|
| 4,297,629 A * | 10/1981 | Godard | ............... H01M 10/441 307/66 |
| 6,639,331 B2 | 10/2003 | Schultz | |
| 8,519,565 B2 | 8/2013 | Dozier et al. | |
| 8,604,639 B2 | 12/2013 | Hopwood | |
| 9,240,687 B2 | 1/2016 | Carralero et al. | |
| 9,644,431 B2 | 5/2017 | Myers et al. | |

(Continued)

FOREIGN PATENT DOCUMENTS

WO    2018213925 A1    11/2018

*Primary Examiner* — Daniel Cavallari
*Assistant Examiner* — Brian K Baxter

(57) ABSTRACT

A well construction system with motor equipment having at least one of a drawworks motor, a top drive motor, or a combination thereof, and an electrical power system having a power recovery and regeneration system. The power recovery and regeneration system includes at least one energy storage device that is not a capacitor bank. The well construction system may be operated by generating AC power that is made available on an AC node, converting AC power available on the AC node to DC power available on a DC node, storing energy based on DC power available on the DC node by the power recovery and regeneration system, and regenerating the stored energy from the power recovery and regeneration system to AC power, DC power, or a combination thereof for consumption by an electrical consumer of the well construction system.

19 Claims, 8 Drawing Sheets

(56) References Cited

U.S. PATENT DOCUMENTS

| | | |
|---|---|---|
| 9,803,461 B2 | 10/2017 | Boone |
| 9,806,530 B2 | 10/2017 | Martinez |
| 10,017,993 B2 | 7/2018 | Hu et al. |
| 10,151,178 B2 | 12/2018 | Stephenson et al. |
| 10,181,800 B1* | 1/2019 | Nayar ................. H02J 3/32 |
| 10,243,371 B2 | 3/2019 | Gerdes et al. |
| 10,309,166 B2 | 6/2019 | Thiemann et al. |
| 10,389,113 B2* | 8/2019 | Bourgeau .............. H02J 1/12 |
| 10,390,466 B2 | 8/2019 | Held et al. |
| 10,472,953 B2 | 11/2019 | Orban |
| 10,597,996 B2 | 3/2020 | Boone |
| 10,649,427 B2 | 5/2020 | Krippner et al. |
| 10,655,292 B2 | 5/2020 | Orban |
| 10,662,709 B2 | 5/2020 | Orban |
| 10,673,238 B2 | 6/2020 | Boone et al. |
| 2002/0179354 A1* | 12/2002 | White ................... B60K 8/00 180/165 |
| 2004/0207266 A1* | 10/2004 | Abel ................... H02J 9/066 307/80 |
| 2008/0203734 A1* | 8/2008 | Grimes .................. E21B 3/02 290/40 R |
| 2009/0312885 A1* | 12/2009 | Buiel .................... H02J 3/32 700/297 |
| 2011/0074165 A1* | 3/2011 | Grimes ................. E21B 19/08 290/40 C |
| 2013/0271083 A1* | 10/2013 | Williams ................ H02J 9/06 320/128 |
| 2013/0307444 A1* | 11/2013 | Settemsdal ............. H02J 4/00 318/139 |
| 2014/0103727 A1* | 4/2014 | Taimela ................. H02J 3/24 307/76 |
| 2015/0372492 A1* | 12/2015 | Kuttel ................... H02J 3/38 175/203 |
| 2016/0308362 A1* | 10/2016 | Jung .................... H02J 3/30 |
| 2016/0336928 A1* | 11/2016 | Kuznetsov .............. H02J 3/30 |
| 2016/0352099 A1* | 12/2016 | Bourgeau ............... H02J 1/12 |
| 2017/0067303 A1* | 3/2017 | Thiemann ............... E21B 3/02 |
| 2017/0133852 A1* | 5/2017 | Macdonald ............. H02J 7/34 |
| 2017/0211338 A1 | 7/2017 | Myers et al. |
| 2017/0298721 A1* | 10/2017 | Shin .................... E21B 7/12 |
| 2018/0034280 A1* | 2/2018 | Pedersen ............... H02J 3/32 |
| 2018/0066506 A1 | 3/2018 | Boone |
| 2018/0109110 A1 | 4/2018 | Gerdes et al. |
| 2018/0123384 A1* | 5/2018 | Foo ..................... H02J 5/00 |
| 2019/0048666 A1 | 2/2019 | Orban et al. |
| 2019/0048667 A1 | 2/2019 | Krippner et al. |
| 2019/0048686 A1 | 2/2019 | Krippner et al. |
| 2019/0048687 A1 | 2/2019 | Krippner et al. |
| 2019/0051431 A1 | 2/2019 | Orban et al. |
| 2019/0115758 A1 | 4/2019 | Orban et al. |
| 2019/0267805 A1 | 8/2019 | Kothuru et al. |
| 2020/0100385 A1 | 3/2020 | Held et al. |
| 2020/0220135 A1 | 7/2020 | Pedersen ............. H01M 10/613 |

\* cited by examiner

ELECTRICAL POWER GENERATION AND DISTRIBUTION SYSTEM WITH POWER RECOVERY AND REGENERATION

BACKGROUND OF THE DISCLOSURE

In the drilling of oil and gas wells, drilling rigs are used to create a well by drilling a wellbore into a formation to reach oil and gas deposits. During the drilling process, as the depth of the wellbore increases, so does the length and weight of the drillstring. The drilling rig may be electrically operated from generators driven by engines. Several generators may operate in parallel to provide sufficient electrical power, perhaps including with enough margin to power during electricity blackouts. During various operations of the drilling rig, the power demand of the drilling may vary with a large power gradient versus time. This may impose large power swings on the rig power grid, with potential erratic responses of some components, including engines. Also, in some operating conditions, large amounts of energy may be dumped into heat.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a well construction system. The well construction system includes motor equipment and an electrical power system. The motor equipment includes a drawworks motor, a top drive motor, or a combination thereof. The electrical power system includes a generator-set that generates AC electrical power that is output at a generator node of the generator-set. The electrical power system also includes a rectifier. An input node of the rectifier is coupled to the generator node during a generation state of the generator-set. The rectifier converts AC electrical power received at the input node of the rectifier to DC electrical power that is output to an output node of the rectifier. The output node of the rectifier is coupled to a DC node. The electrical power system also includes a inverter electrically coupled between the DC node and the motor equipment. The inverter inverts DC electrical power received from the DC node to AC electrical power that is provided to the motor equipment. The inverter also converts AC electrical power generated by the motor equipment to DC electrical power that is provided to the DC node. The electrical power system also includes a power recovery and regeneration system electrically coupled to the DC node during a recovery state and during a regeneration state. The power recovery and regeneration system includes a first energy storage device and a second energy storage device. The first energy storage device is connected in parallel with the second energy storage device during a charge state. The first energy storage device is connected in series with the second energy storage device during a discharge state. At least one of the first and second energy storage devices does not comprise a capacitor bank.

The present disclosure also introduces a method including operating a well construction system. The well construction system includes motor equipment and an electrical power system. The motor equipment includes a drawworks motor, a top drive motor, or a combination thereof. The electrical power system includes a power recovery and regeneration system, which includes an energy storage device that is not a capacitor bank. Operating the well construction system includes generating AC electrical power that is made available on an AC node, and converting AC electrical power available on the AC node to DC electrical power available on a DC node. The motor equipment consumes DC electrical power available on the DC node. Operating the well construction system also includes storing energy based on DC electrical power available on the DC node by the power recovery and regeneration system, and regenerating the stored energy from the power recovery and regeneration system to AC electrical power, DC electrical power, or a combination thereof for consumption by an electrical consumer of the well construction system.

The present disclosure also introduces a method including operating a well construction system that includes a generator-set, an electrical system, and an electrical power consumer. The generator-set includes a prime mover and a synchronous electrical machine. The electrical system includes a power recovery and regeneration system, which includes an energy storage device that is not a capacitor bank. The electrical power consumer is electrically coupled to the electrical system. Operating the well construction system includes storing, in the power recovery and regeneration system, energy distributed in the electrical system. Operating the well construction system also includes starting the prime mover, which includes electrically coupling the power recovery and regeneration system to the synchronous electrical machine.

The present disclosure also introduces an apparatus including a well construction system that includes motor equipment and an electrical power system. The motor equipment includes a drawworks motor, a top drive motor, or a combination thereof. The electrical power system includes a generator-set that generates AC electrical power that is output at a generator node of the generator-set. The electrical power system also includes a rectifier. An input node of the rectifier is coupled to the generator node during a generation state of the generator-set. The rectifier converts AC electrical power received at the input node of the rectifier to DC electrical power that is output to an output node of the rectifier. The output node of the rectifier is coupled to a DC node. An inverter is electrically coupled between the DC node and the motor equipment. The inverter inverts DC electrical power received from the DC node to AC electrical power that is provided to the motor equipment, and converts AC electrical power generated by the motor equipment to DC electrical power that is provided to the DC node. A power recovery and regeneration system is electrically coupled to the DC node during a recovery state and during a regeneration state. The power recovery and regeneration system includes a first energy storage device and a second energy storage device. The first energy storage device is connected in parallel with the second energy storage device during a charge state, and is connected in series with the second energy storage device during a discharge state. Each of the first and second energy storage devices includes a capacitor bank, a battery, a flywheel, and/or a combination thereof.

The present disclosure also introduces a method including operating a well construction system that includes motor equipment and an electrical power system. The motor equipment includes a drawworks motor, a top drive motor, or a combination thereof. The electrical power system includes a power recovery and regeneration system that includes a capacitor bank, a flywheel, or a combination thereof. Operating the well construction system includes generating AC electrical power that is made available on an AC node, and converting AC electrical power available on the AC node to DC electrical power available on a DC node. The motor equipment consumes DC electrical power available on the DC node. Operating the well construction system also includes storing energy based on DC electrical power available on the DC node by the power recovery and regeneration system, and regenerating the stored energy from the power recovery and regeneration system to AC electrical power, DC electrical power, or a combination thereof for consumption by an electrical consumer of the well construction system.

The present disclosure also introduces a method including operating a well construction system that includes a generator-set, an electrical system, and an electrical power consumer. The generator-set includes a prime mover and a synchronous electrical machine. The electrical system includes a power recovery and regeneration system that includes a capacitor bank, a flywheel, or a combination thereof. The electrical power consumer is electrically coupled to the electrical system. Operating the well construction system includes storing, in the power recovery and regeneration system, energy distributed in the electrical system. Operating the well construction system also includes starting the prime mover, including electrically coupling the power recovery and regeneration system to the synchronous electrical machine. Operating the well construction system may thereafter comprise operating the prime mover and the synchronous electrical machine as a normal generator-set.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
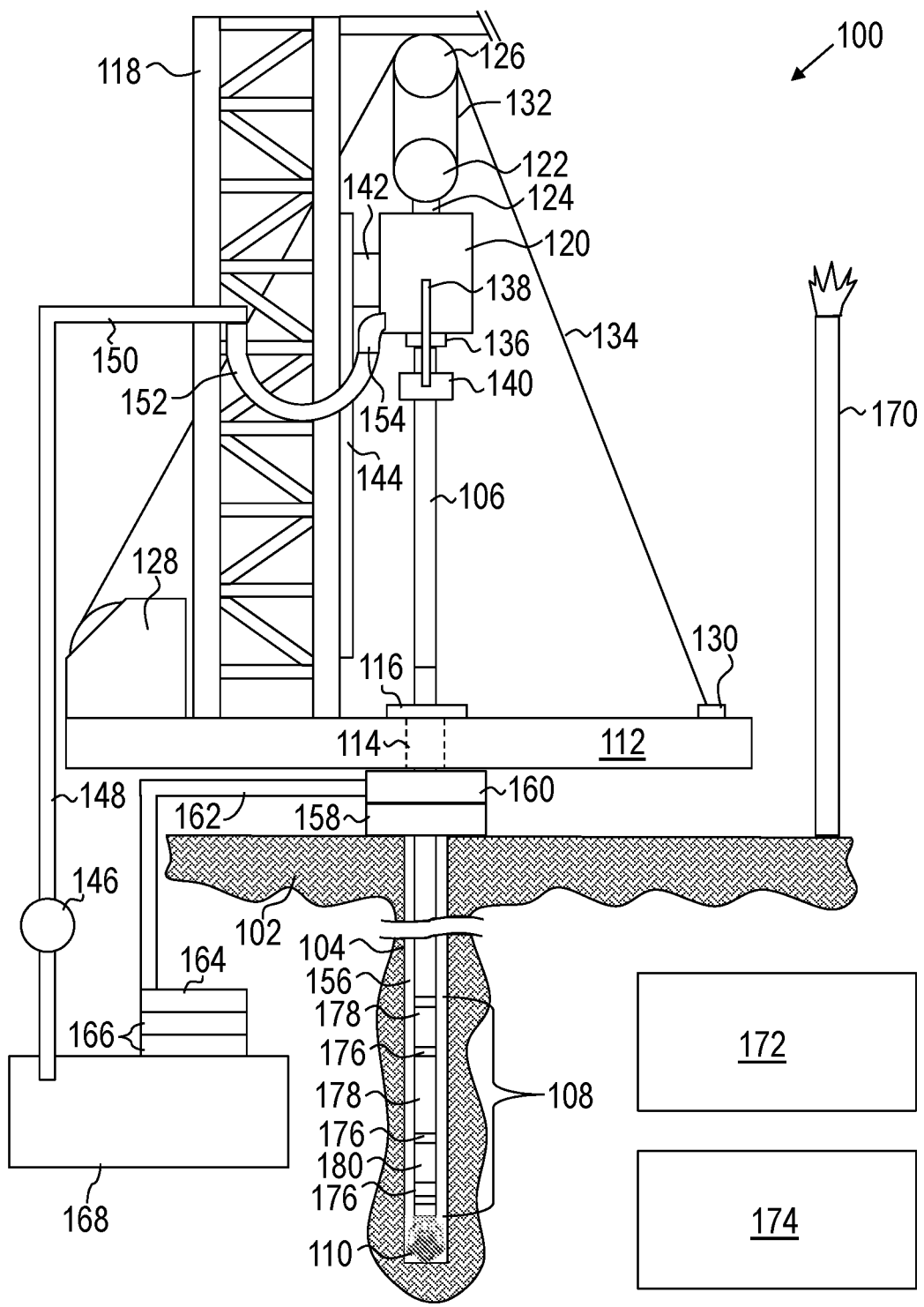
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

The present disclosure introduces one or more aspects pertaining to limiting the power transient on the drilling rig power grid, as well as recovering some energy during operations involving stored energy recovery, such as potential energy when the drillstring moves downwards in the wellbore. The present disclosure introduces one or more aspects pertaining to storing and retrieving energy in various mediums, such as may reduce the transient effect and/or enhance efficiency of power generation.

Systems and methods and/or processes according to one or more aspects of the present disclosure may be used or performed in connection with well construction operations, such as at a well site for constructing a well to obtain hydrocarbons (e.g., oil and/or gas) from a formation. For example, some aspects may be described in the context of drilling a wellbore in the oil and gas industry. One or more aspects of the present disclosure may be applied in other contexts, such as for any construction operations.

One or more aspects of the present disclosure may permit generation, recovery, and regeneration of electrical power. For example, during some operations, excess electrical power may be generated and/or some equipment may be operated in a way that temporarily generate electrical power, and this electrical power may be stored in "energy storage systems." This period may be referred to herein as the "charging" period of the energy storage system. In other conditions, the stored energy may be extracted from the energy storage system. This may be referred to herein as the "discharge" or "recovery" period of the energy storage system. Such energy storage systems may include one or more energy storage devices, such as a capacitor bank or/and a battery and/or a flywheel. The charging and discharging of the storage system may involve some losses. The recovered energy is less than the provided energy during the charging period. Energy recovery from the storage system corresponds to the energy discharge from this storage system, associated with regeneration of power on the rig power grid(s). Such recovery of energy and power regeneration may occur during, for example, instances when a demand of a well construction system exceeds generation of electrical power, and/or during low power states to permit one or more generator-sets ("gensets") to become inactive. Other aspects of the present disclosure may permit operation of gensets independently of each other to permit increased efficiency of the gensets. One or more aspects of the present disclosure also pertain to permitting the genset to operate at optimum speed for highest system efficiency. Further aspects of the present disclosure may permit power recovery and regeneration equipment to operate in conjunction with a fast-starting process of additional gensets when the rig power demand reaches or exceeds the capacity of the active genset(s). The fast-starting process of the genset may be based on the usage of the alternator as a direct-current brushless (DCBL) motor using part of the stored energy to start the genset and to insure its proper connection to the rig power grid. Other aspects of the present disclosure, and various modifications apparent to a person having ordinary skill in the art that are within the scope of the present disclosure, may be gleaned from the present disclosure.

FIG. 1 is a schematic view of at least a portion of an example implementation of a well construction system 100 operable to drill a wellbore 104 into one or more subsurface formations 102 at a well site in accordance with one or more aspects of the present disclosure. A drillstring 106 penetrates the wellbore 104 and includes a bottom hole assembly (BHA) 108 that comprises or is mechanically and hydraulically coupled to a drill bit 110.

The well construction system 100 includes a mast 118 (at least a portion of which is depicted in FIG. 1) extending from a rig floor 112 that is erected over the wellbore 104. A top drive 120 is suspended from the mast 118 and is mechanically coupled to the drillstring 106, which extends through an opening 114 in the rig floor. The top drive 120 provides a rotational force (e.g., torque) to drive rotational movement of the drillstring 106, such as to advance the drillstring 106 into the one or more subsurface formations 102 to form the wellbore 104.

Manual, mechanized, and/or automated slips 116 may also be disposed in the opening 114 through the rig floor 112. The drillstring 106 can extend through the slips 116. In mechanized and/or automated implementations of the slips 116, the slips 116 can be actuated between open and closed positions. In the open position, the slips 116 permit advancement of the drillstring 106 through the slips 116. In the closed position, the slips 116 clamp the drillstring 106 to prevent advancement of the drillstring 106, including with sufficient force to support the weight of the drillstring 106 suspended in the wellbore 104. In manual implementations of the slips 116, the slips 116 may be manually placed in the opening 114 to clamp the drillstring 106 to prevent advancement of the drillstring 106, including with sufficient force to support the weight of the drillstring 106 suspended in the wellbore 104. The slips 116 may be manually removed from the opening 114 to permit advancement of the drillstring 106 through the opening 114 and into the one or more formations 102.

The top drive 120 is suspended from the mast 118 via hoisting equipment. The hoisting equipment includes a traveling block 122 with a hook 124, a crown block 126, a drawworks 128, a deadline anchor 130, a supply reel (not depicted), and a drill line 132 with a deadline 134. The hook 124 of the traveling block 122 mechanically couples with the top drive 120, although other means for coupling the traveling block 122 with the top drive 120 are also within the scope of the present disclosure. The crown block 126 is suspended from, coupled with, and/or otherwise supported by the mast 118.

The drawworks 128 and the deadline anchor 130 are on and supported by the rig floor 112. The drill line 132 is supplied from the supply reel through the deadline anchor 130. The drill line 132 may be wrapped around and clamped at the deadline anchor 130 such that the drill line 132 that extends from the deadline anchor 130 to the crown block 126 is stationary during normal drilling operations, and hence, the portion of the drill line 132 that extends from the deadline anchor 130 to the crown block 126 is referred to as the deadline 134.

The crown block 126 and traveling block 122 comprise one or more pulleys or sheaves. The drill line 132 is reeved around the pulleys or sheaves of the crown block 126 and the traveling block 122. The drill line 132 extends from the crown block 126 to the drawworks 128. The drawworks 128 can comprise a drum, a prime mover (e.g., an electrical motor), a control system, and one or more brakes, such as a mechanical brake (e.g., a disk brake), an electrodynamic brake, and/or the like. The prime mover of the drawworks 128 drives the drum to rotate and reel in drill line 132, which in turn causes the traveling block 122 and the top drive 120 to move upward. The drawworks 128 can reel out drill line 132 by a controlled rotation of the drum using the prime mover and control system, and/or by disengaging the prime mover (such as with a clutch) and disengaging and/or operating one or more brakes to control the release of the drill line 132. By unreeling drill line 132 from the drawworks 128, the traveling block 122 and the top drive 120 may move downward.

Implementations within the scope of the present disclosure include land-based rigs, as depicted in FIG. 1, as well as offshore implementations. In offshore implementations, the hoisting equipment may also include a motion or heave compensator between the mast 118 and the crown block 126 and/or between the traveling block 122 and the hook 124, for example.

The top drive 120 includes a drive shaft 136, a pipe handling assembly 138 with an elevator 140, and various other components not shown in FIG. 1, such as a prime mover and a grabber. The drillstring 106 is mechanically coupled to the drive shaft 136 (e.g., with or without a sub saver between the drillstring 106 and the drive shaft 136). The prime mover drives the drive shaft 136, such as through a gearbox or transmission, to rotate the drive shaft 136 and, therefore, the drillstring 106, such as to advance the drillstring 106 into the one or more subsurface formations 102 to form the wellbore 104. The prime mover for the top drive 120 may be an electrical motor (or a set of electrical motors). The pipe handling assembly 138 and elevator 140 permit the top drive 120 to handle tubulars (e.g., single, double, or triple stands of drill pipe and/or casing) that are not mechanically coupled to the drive shaft 136. The grabber includes a clamp that clamps onto a tubular when making up and/or breaking out a connection of a tubular with the drive shaft 136. A guide system (e.g., rollers, rack-and-pinion elements, and/or other mechanisms) includes a guide 144 affixed or integral to the mast 118 and portions 142 integral to or otherwise carried with the top drive 120 up and down the guide 144. The guide system may provide torque reaction, such as to prevent rotation of the top drive 120 while the prime mover is rotating the drive shaft 136. The guide system may also or instead aid in maintaining alignment of the top drive 120 with the opening 114 in the rig floor 112 through which the drillstring 106 extends.

A drilling fluid circulation system circulates oil-based mud (OBM), water-based mud (WBM), and/or other drilling fluid to the drill bit 110. A pump (or set of pumps) 146 delivers drilling fluid through, for example, a discharge line 148, a standpipe 150, and a rotary hose 152 to a port 154 of the top drive 120. The drilling fluid is then conducted through the drillstring 106 to the drill bit 110, exiting into the wellbore 104 via ports in the drill bit 110. The drilling fluid then circulates upward through an annulus 156 defined between the outside of the drillstring 106 and the wall of the wellbore 104. In this manner, the drilling fluid lubricates the drill bit 110 and carries formation cuttings up to the surface as the drilling fluid is circulated.

At the surface, the drilling fluid may be processed for recirculation. For example, the drilling fluid may flow through a blowout preventer 158 and a bell nipple 160 that diverts the drilling fluid to a return flowline 162. The return flowline 162 may direct the drilling fluid to a shale shaker 164 that removes at least large formation cuttings from the drilling fluid. The drilling fluid may then be directed to reconditioning equipment 166, such as may remove gas and/or finer formation cuttings from the drilling fluid. The reconditioning equipment 166 can include a desilter, a desander, a degasser, a centrifuge, and/or other components.

After treatment by the reconditioning equipment 166, the drilling fluid may be conveyed to one or more mud tanks 168. Intermediate mud tanks may also be used to hold drilling fluid before and/or after the shale shaker 164 and/or various ones of the reconditioning equipment 166. The mud tank(s) 168 can include an agitator to assist in maintaining uniformity (e.g., homogeneity) of the drilling fluid contained therein. A hopper (not depicted) may be disposed in a flowline between the mud tank(s) 168 and the pump 146 to disperse an additive, such as caustic soda, in the drilling fluid.

The well construction system 100 can also include other equipment, such as to handle tubulars (e.g., drill pipes and/or casing, which may further be single joints and/or double- or triple-joint stands). Example equipment that may be operable to handle tubulars can include a catwalk for transferring tubulars from a ground level to the rig floor 112, an iron roughneck to make up and/or break out joints of tubulars (e.g., in a drillstring), a pipe handling manipulator operable to transfer tubulars from, e.g., the drillstring to a fingerboard for storage (e.g., temporary storage during tripping operations) of the tubulars, and/or other example equipment. In accordance with one or more aspects of the present disclosure, various equipment can be used to perform functions relating to handling tubulars in an automated manner, personnel can manually handle tubulars, and/or any permutation therebetween.

To form the wellbore 104 (e.g., "make hole"), the hoisting equipment lowers the top drive 120, and thus the drillstring 106 suspended from the top drive 120, while the top drive 120 rotates the drillstring 106. During this advancement of the drillstring 106, the slips 116 are in the open position and/or are removed. When the upper end of the tubular in the drillstring 106 that is made up to the top drive 120 nears the slips 116, the hoisting equipment ceases downward movement of the top drive 120, the top drive 120 ceases rotating the drillstring 106, and the slips 116 close and/or are placed in the opening 114 to clamp the drillstring 106. The grabber of the top drive 120 clamps the upper portion of the tubular made up to the drive shaft 136. The drive shaft 136 is driven via operation of the prime mover of the top drive 120 to break out the connection between the drive shaft 136 and the drillstring 106. The grabber of the top drive 120 then releases the tubular of the drillstring 106, and the hoisting equipment raises the top drive 120 clear of the "stump" of the drillstring 106 extending upward from the slips 116.

The elevator 140 of the top drive 120 is then pivoted away from the drillstring 106 towards another tubular extending up through the rig floor 112, such as via operation of a catwalk and/or manual transfer of the tubular. The elevator 140 and the hoisting mechanism are then operated to grasp the additional tubular with the elevator 140. The hoisting equipment then raises the additional tubular, and the elevator 140 and the hoisting equipment are then operated to align and lower the bottom end of the additional tubular to proximate the upper end of the stump.

A joint between the tubular and the stump of the drillstring 106 is made up. For example, an iron roughneck can clamp onto the stump of the drillstring 106 and can then rotate the suspended tubular to engage a threaded (e.g., male) connector with a threaded (e.g., female) connector at the top end of the stump. Such spinning continues until achieving a predetermined torque, number of spins, vertical displacement of the additional tubular relative to the stump, and/or other operational parameters. The iron roughneck can then clamp onto and rotate the additional tubular with a higher torque sufficient to complete making up the connection with the stump. In another example, roughnecks can manually make up the joint, such as by using tongs, a cathead, and/or other equipment. By creating this joint, the additional tubular becomes part of the drillstring 106.

The grabber of the top drive 120 then grasps the drillstring 106 proximate the upper end of the drillstring 106. The drive shaft 136 is moved into contact with the upper end of the drillstring 106 and is rotated via operation of the prime mover to make up a connection between the drillstring 106 and the drive shaft 136. The grabber then releases the drillstring 106, and the slips 116 are moved into the open position and/or are removed. Drilling may then resume.

During drilling operations, managed pressure drilling may be implemented to maintain a pressure within the wellbore 104. A flare stack 170 can be implemented in a managed pressure drilling system to burn off excess gas originating from the wellbore 104. By burning off excess gas, the flare stack 170 can facilitate maintaining pressure in the wellbore 104.

A power distribution center 172 is also at the well site. The power distribution center 172 includes at least a portion of an electrical power distribution system (examples of which are described below and illustrated in following figures), one or more hydraulic systems, one or more pneumatic systems, the like, or a combination thereof. The electrical power distribution system of the power distribution center 172 can distribute alternating current (AC) and/or direct current (DC) electrical power to various motors, pumps, or the like that are throughout the well construction system 100. Similarly, the power distribution center 172 can distribute pneumatic and/or hydraulic power throughout the well construction system 100. Components of the power distribution center 172 can be centralized in the well construction system 100 or can be distributed throughout the well construction system 100. For example, when one or more components of the well construction system 100 is mobile and/or moveable such as the rig floor 112 and equipment supported thereby (e.g., a "walking" rig), some components can be situated in a fixed location at the well site, such as the one or more generators and some components of the electrical power distribution system, while other components can be supported by the mobile and/or moveable component(s), such that those other components may be moveable with the mobile and/or moveable component(s).

A control center 174 is also at the well site. The control center 174 houses one or more processing systems of a network of the well construction system 100. Generally, various equipment of the well construction system 100, such as the drilling fluid circulation system, the hoisting equipment, the top drive 120, etc., can have various sensors and controllers to monitor and control the operations of that equipment. Additionally, the control center 174 can receive information regarding the formation and/or downhole conditions from modules and/or components of the BHA 108.

The BHA 108 can comprise various components with various capabilities, such as measuring, processing, and storing information. A telemetry device can be in the BHA 108 to enable communications with surface equipment (which includes a surface acquisition module that receives communications from the telemetry device), such as at the control center 174. The telemetry may be based on mud-pulse telemetry (sending coded pressure wave to the surface via the drillstring) or e-mag telemetry (sending coded current wave through the earth and the drillstring). The BHA 108 shown in FIG. 1 is depicted as having a modular construction with specific components in certain modules. However, the BHA 108 may be unitary or select portions thereof may be modular. The modules and/or the components therein may be positioned in a variety of configurations throughout the BHA 108. The BHA 108 may comprise a measurement while drilling (MWD) module 176 that may include tools operable to measure wellbore trajectory, wellbore temperature, wellbore pressure, and/or other example properties.

The BHA 108 may also include a steering system operable to change the trajectory of the wellbore. Such device is installed above the drill bit 110. This steering device can be either a steerable motor or a rotary steerable motor. The steerable motor operates in a sliding mode while steering the drill bit 110. Such process utilizes specific angular positioning of the top drive shaft 136 to set the steerable motor toolface. Furthermore, oscillation of this angular position may be imposed by the top drive 120, and accurate control of the top drive motor either drives the motor against the drillstring torque or dissipates the rotational energy into a brake resistor when rotating opposite the make-up direction of threaded connections between the joints of the drillstring (e.g., counterclockwise). When using a rotary steerable motor (RSS), the RSS acts as self-control robot to change the trajectory of the wellbore while the drillstring 106 is maintained in rotation by the motor of the top drive 120. The setting of the RSS is via downlink to the BHA (either to the MWD or RSS), such as via the transmission of a digital frame(s) via modulation of the flow of the pump(s) 146. Such process utilizes control of the pump(s) 146 so that a fast flow rate change can be delivered to generate the digital bit pattern of the frame via the flow rate. Such sharp variations of flow rate translate into sharp variations of power requirement from the rig power grid.

The BHA 108 may comprise a logging while drilling (LWD) module 180 that may include tools operable to measure formation parameters and/or fluid properties, such as resistivity, porosity, permeability, sonic velocity, optical density, pressure, temperature, and/or other example properties. The BHA 108 may comprise a formation pressure measurement while drilling (PWD) and/or sampling while drilling (SWD) system comprising a sample module 178 for communicating a formation fluid through the BHA 108 and/or obtaining a sample of the formation fluid. The PWD and/or SWD system may comprise gauges, sensors, monitors, and/or other devices that may also be utilized for downhole formation pressure measurement and/or sampling and/or testing of a formation fluid. The operation of PWD and SWD tools may also utilize downlink to the BHA 108.

During well construction, the drillstring 106 may be removed from the wellbore 104, such as for when a casing is to be lowered in the wellbore 104. The lowering of this casing may create heavy loads on the drawworks 128. The short lifting to remove the slips may create a power drain on the rig power grid, followed by a 12-meter (for example) slide downwards, which is accompanied by heavy brake action and concurrent heavy energy dissipation in the resistor brake. When the casing is at the proper depth, the cementing of that casing may be performed. This may entail cement slurry displacement involving pump action while reciprocating the casing over a stroke of more than 4-5 meters (for example). Such stroking of the casing may generates large variation of electrical power conditions, such as high electrical consumption during the upward stoke followed by heavy braking, which may include dissipating electrical energy through the brake resistor associated with the drawworks 128.

A person having ordinary skill in the art will readily understand that a well construction system may include more or fewer equipment than as described herein and/or depicted in the figures. Additionally, various equipment and/or systems of the example implementation of the well construction system 100 depicted in FIG. 1 may include more or fewer equipment. For example, various engines, motors, hydraulics, actuators, valves, or the like that were not described above and/or depicted in FIG. 1 may be included in other implementations of equipment and/or systems also within the scope of the present disclosure.

Additionally, the well construction system 100 of FIG. 1 may be implemented as a land-based rig or on an offshore rig. One or more aspects of the well construction system 100 of FIG. 1 may be incorporated in and/or omitted from a land-based rig or an offshore rig. Such modifications are within the scope of the present disclosure. In the case of offshore rigs, fixed units (not floating) are similar to land rigs. However, floating units involve heave compensation systems for the risers and the tubulars in the wellbore. Such heave compensations can be entail a riser tension meter and drillstring compensation. Furthermore, floating units entail positioning to stay above the well within sufficient accuracy. Such positioning may be achieved via the usage of windlasses to pull on anchoring systems, or via dynamic positioning using propeller systems. These systems may also generate large variations of power requirements on the rig power grid.

Even further, one or more equipment and/or systems of the well construction system 100 of FIG. 1 may be transferrable via a land-based movable vessel, such as a truck and/or trailer. As examples, each of the following equipment and/or systems may be transferrable by a separate truck and trailer combination: the mast 118, the drawworks 128, the power distribution center 172, the control center 174, and mud tanks 168 (and associated pump 146, shale shaker 164, and reconditioning equipment 166), etc. Some of the equipment and/or systems may be collapsible to accommodate transfer on a trailer. For example, the mast 118 and/or other equipment and/or systems may be telescopic, folding, and/or otherwise collapsible. Other equipment and/or systems may be collapsible by other techniques, or may be separable into subcomponents for transportation purposes.

In some land rig applications, the rig power may be provided from a fixed power grid. In such cases, the distance to the power plants may be sufficient enough that voltage swings may be generated during the power transient at the rig.

Figure 2:
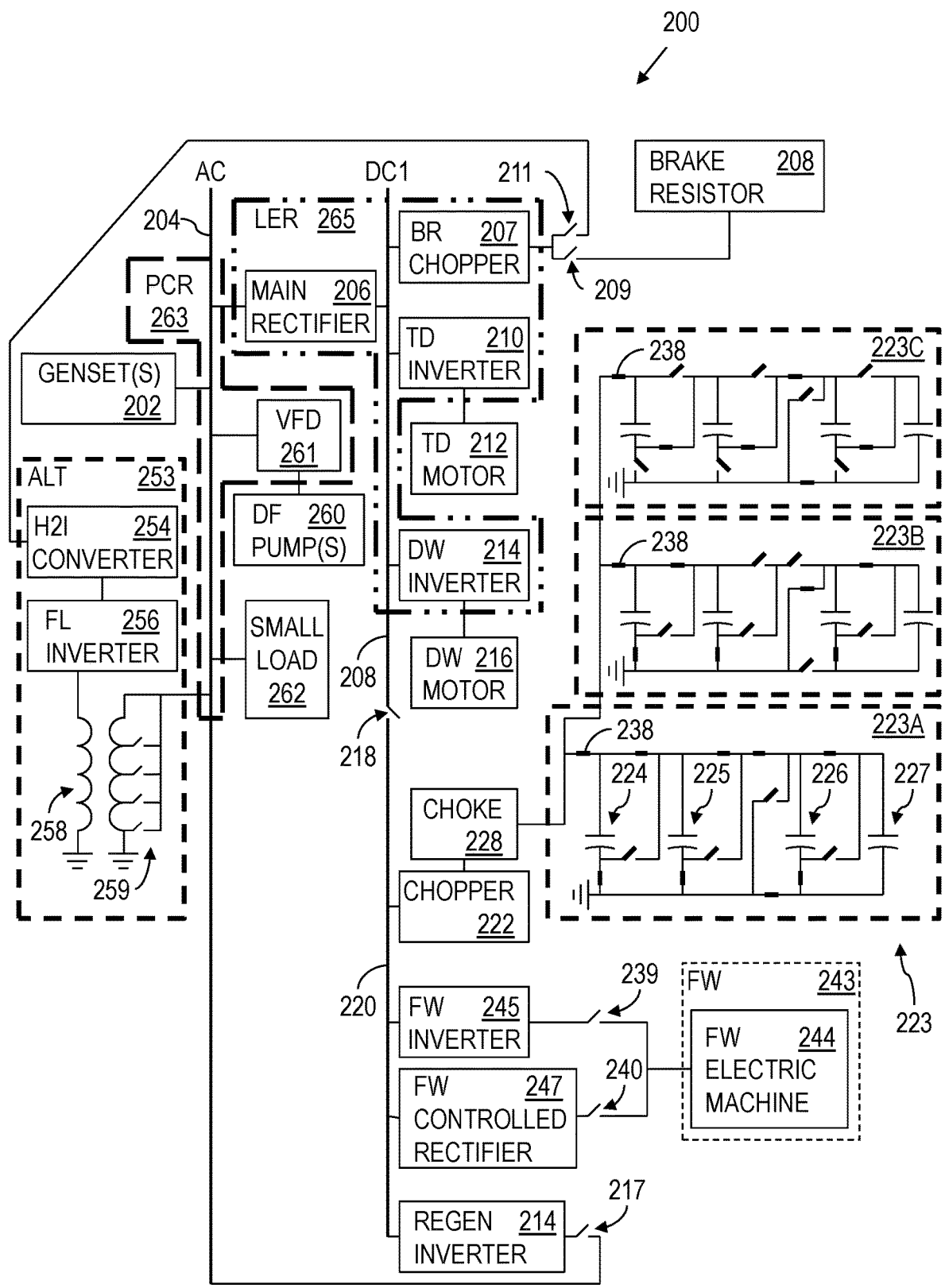
FIG. 2 is a schematic view of at least a portion of an example implementation of apparatus according to one or more aspects of the present disclosure.

FIG. 2 is a schematic view of at least a portion of an example implementation of an electrical power generation and distribution (EPGD) system 200 according to one or more aspects of the present disclosure. Portions of the schematic view may be in a form referred to as a one-line schematic. A person having ordinary skill in the art will readily understand that multiple conductors carrying different phases of alternating current (AC) electrical voltage and/or current may be illustrated as a single line in a one-line schematic. The EPGD system 200 includes electrical power generation and electrical power recovery and regeneration. For the sake of clarity, the below description of the EPGD system 200 is presented in the context of the well construction system 100 depicted in FIG. 1, with the understanding that the EPGD system 200 shown in FIG. 2 is an example implementation of EPGD systems within the scope of the present disclosure, and that the EPGD system 200 and similar implementations may be deployed in the well construction system 100 shown in FIG. 1 and other well construction systems within the scope of the present disclosure.

The EPGD system 200 includes one or more gensets 202 each including one or more generators. A genset can be or include, for example, a prime mover, such as an engine like a diesel or natural gas engine or a turbine, and an alternator. The prime mover drives rotation of the alternator to create a magnetic flux in the alternator and thereby induce an AC electrical power. For example, a drive shaft of the prime mover can be mechanically coupled to a rotor of the alternator such that the drive shaft of the prime mover is capable of driving rotation of the rotor to thereby induce the AC electrical power in a stator of the alternator. In some examples when in a steady state generation mode, the one or more gensets 202 can generate three-phase 600 V AC power at 60 Hz. The electrical power generated by the one or more gensets 202 is output to a common AC node 204 (e.g., a bus), and hence, the one or more gensets 202 are electrically connected to the common AC node 204. The common AC node 204 can be or include electrical cables, bus bars, a combination thereof, and/or other example conductive components. Various circuit breakers and/or switches (not shown) may be disposed between the one or more gensets 202 and the common AC node 204 to control bringing the one or more gensets 202 online and/or decoupling the one or more gensets 202 from the EPGD system 200.

A power control room (PCR) 263 includes a control system(s) for the gensets 202 to insure proper output, frequency and voltage, as well as multiple breakers (not shown) to control the safety of power distribution. On the drilling rig, there are two main locations for power consumption, the pump system 146 and the central package The pump system 146, designated in FIG. 2 as drilling fluid (DF) pumps 260, may comprise multiple (e.g., two to five) triplex or other types of pumps. Each pump may be driven by one or more electric motors, which may be associated with one or more variable frequency drives (VFDs). Thus, the EPGD system 200 includes a VFD system 261, which may comprise two to ten VFDs depending, for example, on the pumping configuration of the well construction system. Each VFD may be individually driven at its selected operating mode. The VFD(s) associated with the pumps 260 may be located in a power house, such as either a dedicated triplex power room (TPR) or the PCR 263. The PCR 263 may be located in the vicinity of the genset(s). Each VFD for the pumps 260 may be either an independent VFD or a set of inverters fed by a single rectifier involving a DC bus (not shown) to feed the inverters.

Via the common AC bus 204, the PCR 263 also feeds power to the central package, which may include the drawworks 128, the top drive 120 (and/or rotary table system), and perhaps other major drilling operation components. These components may be driven by one or more electrical motors. Each motor (or set of motors) may be driven by an individual VFD or inverter arrangement. The central package may utilize power fed from two to six VFDs depending, for example, on the rig configuration. The VFDs associated with the central package may be located in a local electrical room (LER) 265, which may be installed in the vicinity of the central package.

To manage power distribution to the LER 265 and perhaps other components of the central package, an input node of a main rectifier 206 is electrically connected to the common AC node 204. The main rectifier 206 is operable to convert AC electrical power available on the common AC node 204 to DC electrical power. The main rectifier 206 can be a thyristor based rectifier or another rectifier (e.g., diode system). The main rectifier 206 can be controlled by a controller to control a voltage level of the DC electrical power output by the main rectifier 206. In some examples within the scope of the present disclosure, the main rectifier 206 can output 800 V DC power, although other examples are also within the scope of the present disclosure. The electrical power output by the main rectifier 206 is output to a first DC node 208 for power feeding related to the central package, for example. The first DC node 208 can be or include electrical cables, bus bars, a combination thereof, and/or other example conductive components.

It is noted that some implementations within the scope of the present disclosure may comprise an independent VFD for each motor. Thus, an independent rectifier and inverter may drive each motor. However, the scope of the present disclosure is not limited to such implementations.

A drawworks (DW) inverter 214 is electrically connected to and electrically disposed between the first DC node 208 and a DW motor 216. The DW motor 216, in this example, is a motor of a drawworks (e.g., drawworks 128 in FIG. 1) driven by a system to control the power feeding (such as a VFD) to that motor, permitting control of rotation direction, speed, torque, and braking. The DW inverter 214, in some examples, is operable to permit a bi-directional flow of electrical current. For example, the DW inverter 214 can be or include an inverter with a freewheel diode. In a first directional flow of current from the first DC node 208 to the DW motor 216, the DW inverter 214 inverts DC electrical power available from the first DC node 208 into AC electrical power. The frequency and amplitude of the AC electrical power is controllable by the DW inverter 214. The AC electrical power is output from the DW inverter 214 to the DW motor 216, which is primarily operated based on the frequency of the AC electrical power. Hence, by controlling the frequency of the AC electrical power output by the DW inverter 214, operation (e.g., rotations-per-minute, or RPM) of the DW motor 216 can be controlled. Thus, for example, the motor operating points (e.g., drive torque and speed) of the motor can be properly set. In a second operating condition, the motor may act as a generator when the rotation speed is higher than the synchronization speed. When opposite directional flow of current from the DW motor 216 to the first DC node 208 occurs, the DW inverter 214 converts AC electrical power generated by the DW motor 216 into DC electrical power via the rectification effect provided by the free-wheeling diodes of the inverter. The DC electrical power is output from the DW inverter 214 to the first DC node 208.

For example, the DW motor 216 can generate power when submitted to sudden deceleration, or when the force acting on the drawworks is in the same direction as the displacement (or velocity). Such situation may occur during trip-in operations. During a trip-in operation, tubulars, such as a drillstring, are lowered into a wellbore, and this lowering results in drill line being released from the drawworks. Gravity and the release of drill line permits the lowering of the tubulars into the wellbore. The release of the drill line drives rotation of the DW motor 216, which may result in the DW motor 216 becoming a temporary generator. The AC electrical power generated as a result of this temporary generation can be converted to DC electrical power by the DW inverter 214 and made available on the first DC node 208. This generated electrical power is sufficiently managed so that the voltage of the first DC node 208 doesn't rise. A brake resistor chopper 207 may operate in chopping action to apply power onto a brake resistor 208 (associated with the drawworks) for a selected proportion of time. This time proportion permits control of the power dissipated in the brake resistor 208.

A top drive (TD) inverter 210 is electrically connected to and electrically disposed between the first DC node 208 and a TD motor 212. The TD motor 212 associated with its inverter 210, in this example, is the motor of the top drive (e.g., top drive 120 in FIG. 1) associated with a method to control its output (such as a VFD). The TD inverter 210 may be operable to permit a variable or even a bi-directional flow of electrical current. For example, the TD inverter 210 can be or include an inverter with a freewheel diode. Thus, in a first directional flow of current from the first DC node 208 to the TD motor 212, the TD inverter 210 may invert DC electrical power available from the first DC node 208 into AC electrical power. The frequency of the AC electrical power is controllable by the TD inverter 210. The AC electrical power is output from the TD inverter 210 to the TD motor 212, which is operated based on the frequency of the provided AC electrical power. Hence, by controlling the frequency of the AC electrical power output by the TD inverter 210, operation (e.g., RPM) of the TD motor 212 can be controlled. In a second, opposite directional flow of current from the TD motor 212 to the first DC node 208, the TD inverter 210 may convert AC electrical power generated by the TD motor 212 into DC electrical power. The DC electrical power is output from the TD inverter 210 to the first DC node 208. In some situations, such as during a stick-slip occurrence of the drillstring driven by the TD motor 212, the TD motor 212 can generate power. During a stick-slip occurrence, a lower portion of a drillstring may become stuck in the wellbore while the top drive continues to rotate the upper portion of the drillstring. With the lower portion being stuck while the upper portion is rotated, a torsional potential energy accrues in the drillstring. After the torsional potential energy builds sufficiently to overcome the forces causing the lower portion to be stuck, the lower portion of the drillstring slips and the torsional potential energy is released, causing increased rotation of the drillstring that may be sufficient to drive rotation of the TD motor 212, which in turn may result in the TD motor 212 becoming a temporary generator. The AC electrical power generated as a result of this temporary generation can be converted to DC electrical power by the TD inverter 210 and made available on the first DC node 208.

A switch 218 is electrically connected to and electrically disposed between the first DC node 208 and a second DC node 220. The second DC node 220 can be or include electrical cables, bus bars, a combination thereof, and/or other example conductive components. The switch 218 is operable to electrically couple and de-couple the first DC node 208 to and from the second DC node 220. The switch 218 and other switches described herein may be an insulated gate bipolar transistor (IGBT), a thyristor with adapted turn-off circuitry, a relay, and/or another type of switch. As described below, the second DC node 220 is controlled to open and close based on various states of power consumption, recovery, and/or regeneration.

A chopper 222 is electrically connected to and electrically disposed between the second DC node 220 and one or more capacitor bank 223. The chopper 222 permits a bi-directional flow of electrical current. The chopper 222 is controllable based on an input signal to determine a frequency, duration of being in a closed stated (to permit current flow), and/or duration of being in an open state (to prevent current flow). In a first operational mode, electrical current may flow from the second DC node 220 through the chopper 222 to capacitor bank 223 during, for example, charging of that capacitor bank 223. Such flow is possible as long of the voltage of the second DC bus 220 is higher than the voltage of that capacitor bank 223. In a second operation mode, electrical current may flow from a capacitor bank 223 through the chopper 222 to the second DC node 220 during, for example, discharging of that capacitor bank 223, as long as the voltage of that capacitor bank 223 is higher than the voltage of the second DC node 220. A choke 228 may be installed in series between the chopper 222 and each capacitor bank 223 to limit the instantaneous current to (or from) the capacitor banks 223. The choke 228 may be an inductor and/or other electrical components.

Each capacitor bank 223 includes a set of first capacitors 224, 225, 226, 227 associated with switches (not numbered). The purpose of these switches is to select the connection of the capacitors 214, 225, 226, 227 either in series or parallel, such as: (a) the four capacitors 224, 225, 226, 227 connected in parallel (as depicted in FIG. 2 by capacitor bank 223A); (b) two blocks of the capacitors connected in parallel (e.g., 224//225 and 226//227) with these two blocks connected in series (as depicted in FIG. 2 by capacitor bank 223B): or (c) all four capacitors 224, 225, 226, 227 connected in series (as depicted in FIG. 2 by capacitor bank 223C).

During energy storage, the four capacitors 224, 225, 226, 227 are connected in parallel (e.g., as depicted by bank 223A), permitting charging up to 900 or even 1000 volts (V). When starting discharge, the capacitors are first discharged to 850 V. Then they are grouped in mode "b" (e.g., as depicted by bank 223B), and the voltage of the bank 223 jumps to 1700 V. The chopper 222 feeds power back to the second DC node 220 until the capacitor bank 223 (in mode "b") drops to 850 V (each capacitor is down to 425 V). Then, capacitor bank 223 is switched to mode "c" (e.g., as depicted by bank 223C), and the voltage jumps again to 1700 V. The chopper 222 continues the discharge cycle until the capacitor bank is down to 850 V (each capacitor is at 212.5 V). With such system, the energy recovery is quite large, because each capacitor will start the discharge cycle in the range higher than 850 V, while the discharge is completed when the capacitor is at 212.5 V. This means that the residual energy in the capacitor is $\frac{1}{16}^{th}$ of the initial value. If the initial charge voltage would be pushed to 1062.5 V, the residual energy would be less than $\frac{1}{25}^{th}$ (4%). Such storage/discharge with the bi-directional chopper 222 and the switches of the capacitor banks 223 may provide an efficient method for a simple implementation. It is noted that the action of the chopper 222 may be coordinated with the switching action inside the capacitor banks 223, such that the chopper 222 does not conduct during switching transitions in the capacitor banks 223.

For the following description, the action of "storage" entails an increase in the energy of a capacitor, battery, flywheel, or other storage apparatus, while "discharge" entails an extraction of energy from the storage apparatus.

"Recovery" pertains to recovering energy that would otherwise be lost, such as the potential energy of the drillstring during trip-in, as this potential energy is "dissipated" into brake actions. "Regeneration" pertains to introducing the recovered energy back into the system. According to one or more aspects of the present disclosure, when speed of the traveling block 122 (carrying the top drive 120) reduces, kinetic energy may be recovered and stored in the capacitor banks 223. When the traveling block 122 is subsequently accelerated upwards, energy is discharged from the capacitor banks 223 and converted into kinetic energy (and/or potential energy) to accelerate the travelling block 122.

Control the direction of current flow to/from the capacitor banks 223 entails controlling the difference between DC voltages of the second DC node 220 and the capacitor banks 223. The method described above for the capacitor banks 223 permits changing voltage by a factor of two at a capacitor bank 223 by switching the capacitors of that bank 223 between three modes (depicted by banks 223A, 223B, and 223C) of different series/parallel arrangements.

During the energy-storing phase, the capacitors 224-227 of the capacitor bank are connected in parallel (as depicted by bank 223A). If multiple capacitor banks 223 are available, a control switch 238 for each capacitor bank 223 is closed. During charging, multiple banks 223 may be connected in parallel onto the chopper 222. During discharge, the capacitors in the individual banks 223 may be connected in series, parallel, or combination of series and parallel to ensure the current flow from the capacitors onto the second DC node 220 via the chopper 222.

Equation (1) set forth below applies when using a capacitor to store energy.

$$E = \tfrac{1}{2}CV^2 \qquad (1)$$

where E is energy, C is capacity of the capacitor, and V is voltage across the capacitor.

Accordingly, the delta energy at the storage bank can be expressed as set forth below in Equation (2).

$$\Delta E = \tfrac{1}{2}C(V_2^2 - V_1^2) \qquad (2)$$

where $V_1$ is the initial voltage and $V_2$ is the final voltage.

With such system, the voltage is a direct indicator of the energy that can be used. It is noted that the voltage at the capacitor increases during energy storage and decreases during discharge. To ensure the proper current transfer while the voltage at the capacitor banks 223 is continuously changing, the switching conditions of the chopper 222 are continuously adjusted.

The size capacitor may be selected in relation to the energy that may be converted from other forms of energy available at the rig. For the drawworks, two types of energy may considered, the kinetic energy of the moving part, and the potential energy available from the movement. The kinetic energy $E_K$ and the potential energy $E_P$ can be determined via Equations (3) and (4) set forth below.

$$E_K = \tfrac{1}{2}mv^2 \qquad (3)$$

$$E_P = mgh \qquad (4)$$

where:
m is the mass of the traveling block and the top drive, tubulars (e.g., drillstring), and/or other equipment carried by the traveling block (collectively the "moving equipment");
v is the velocity of the moving equipment;
g is gravity; and
h is the height of the moving equipment relative to ground level (or the maximum travel distance of the moving equipment).

The velocity may be estimated from an estimated/measured displacement of the moving equipment during a predetermined period of time, such as thirty meters (m) in thirty seconds (s), giving a velocity of 1 m/s. Thus, if the moving equipment had a total weight of 200 tons, the kinetic energy would be about 100 kilojoules (kJ), which is relatively small, whereas the potential energy would be about 60 megajoules (MJ). If such energy is to be stored in a capacitor between a voltage of 900 V and 600 V, the capacity would demand a large capacitor operating at high voltage.

However, in the EPGD 200 depicted in FIG. 2 (and others within the scope of the present disclosure), a capacitor global bank 223 may be built from multiple banks 223A, 223B, 223C, . . . , 223n. With such parallel overall construction, it is possible to ensure multiple combinations of interconnections (series and parallel) to ensure that the resonance frequency defined by the capacitance of the connected capacitor bank onto the inductive load (determined mainly from the motors) has low excitation by the switching (and associated frequency noise) from the chopper 222. An associated PLC (not shown) may be utilized determine optimal set-up of capacitor banks 223 and the switching frequency at the chopper 222 to limit resonance in the system.

The above-described system may also or instead operate with one or more batteries in the bank 223 for energy storage. The similar charge/discharge method may be used to transfer energy in/out of the storage bank 223. The determination of the available energy at the storage 223 may be related to the voltage with a more complex relation than described above for capacitor banks. In such implementations, the level of energy may be normalized at the end of a charge cycle. The current and voltage versus time of charge and discharge of each cycle may also be monitored for a direct estimate of the energy transfer (with its direction).

A flywheel (FW) energy storage 243 can be another system to store energy, whether instead of or in addition to the capacitor- and battery-based storage implementations described above. Such devices include a rotary flywheel permitting storage of kinetic energy $E_{KF}$, such as according to Equation (5) set forth below.

$$E_{KF} = \tfrac{1}{2}I_R \omega^2 \qquad (5)$$

where $I_R$ and $\omega$ are respectively rotary inertia and angular velocity of the flywheel.

The rotary inertia is of a flywheel mechanically linked to an electric machine 244 that can be used as a motor, such as to store energy by accelerating the flywheel, and/or that can be used as a generator, such as to recover energy from the flywheel. The electric machine 244 is connected to power electronics to permit the power transfer from/to the rig power grid, by driving the electric machine 244 as a motor, or by operating the electric machine 244 as a generator. The electric machine 244 may be implemented via different types of electrical, three-phase machines, such as an induction machine or a synchronous machine (either with permanent magnet rotor flux or with DC rotor winding) that may be used as an alternator or a brushless DC (BLDC) motor.

When the electric machine 244 is operated as a motor, it can be driven from the second DC node 220 to accelerate the flywheel sufficiently to consume enough power so that the voltage of the second DC node 220 does not increase above a certain level. An inverter 245 converts DC power from the second DC node 220 to AC voltage for driving the flywheel system 243. The inverter 245 consumes DC power from the second DC node 220 to accelerate the flywheel, and the consumed power equals the "stored" power. The energy (power×time) may be as expressed as set forth below in Equation (6).

$$V_{DC} I_{DC} \Delta t = \tfrac{1}{2} I_R (\omega_2^2 - \omega_1^2) \qquad (6)$$

where:

V$_{DC}$ is DC voltage at the second DC node 220;

I$_{DC}$ is DC current from the second DC node 220 to the inverter 245;

Δt is time;

ω² is final rotational speed of the flywheel; and

ω$_1$ is initial rotational speed of the flywheel.

It is to be noted that energy transfer calculations performed via Equation (6) may have to be compensated or otherwise corrected for system inefficiencies, including, but not limited to inverter and motor inefficiencies.

The control system is operable to ensure the power transfer by continuous monitoring of the DC voltage, and creating the proper drive frequency for the electric machine 244, to ensure the proper increase of rotational speed. In FIG. 2, this is performed by the FW inverter 245.

The stored energy as kinetic energy can be recovered and transformed in electrical power over time by using the electric machine 244 as a generator associated with a rectification system. This rectifier can be a diode associated with the IBGT of the inverter. Depending on the type of electric machine 244, the DC rectification can also be a separated (controlled) rectifier 247 built with thyristors or IGBTs. The voltage of the alternator output can be controlled by the proper setting of the DC flux in the rotor of the electrical machine 244. With such design, the recovered power can be fed back onto the second DC node 220. This may be adequate if the rig central package can absorb this recovered power, such as via lifting actions of the drawworks, drilling actions of the top drive, and others.

The control of regenerated power is performed by a PLC (not shown). In the case of an induction electric machine 244, the control may be performed by the frequency of the FW inverter 245. In the case of a synchronous electric machine 244 with rotor flux winding, the control may affect the DC flux in the rotor of the electric machine 244.

For a synchronous electric machine 244, the voltage output V$_{SEMO}$ may be as set forth below in Equation (7).

$$V_{SEMO} = K\Phi\omega \qquad (7)$$

where K is the machine constant and Φ is DC flux at the rotor (proportional to the injected DC current).

A switch 239 may exist between the FW inverter 245 and the electric machine 244, and a switch 240 may exist between the FW controlled rectifier 247 and the electric machine 244. The switches 239 and 240 may be used depending on the type and control scheme of the electric machine 244.

The recovered energy from the capacitor banks 223 and/or the flywheel system 243 may be fed back to the AC node 204. For example, a regeneration inverter 242 may consume DC power from the second DC node 220 and generate AC power at the correct frequency and phase to be injected back to the AC node 204 via a switch 217. The recovered energy may also be fed back to the AC node 204 via a "four-quadrant" active rectifier used as the main rectifier 206.

For example, in this "discharge" mode, the PLC or other controller (not shown) controls the output of the FW electric machine 244 so that its output voltage is at the proper level, and perhaps adapted to a nominal voltage. If power is to be regenerated as AC power, the PLC also controls the FW inverter 245 (or the active "four quadrant" rectifier 206) to generate the intended output (frequency and voltage). For example, the frequency may be 60 or 50 Hz, and the AC voltage may be 600 V.

In some operating conditions, energy may be stored in the flywheel system 243. In such cases, power may be provided by the drawworks or the top drive. A diode associated with their inverters 210, 214 may be utilized to ensure conversion of electrical power generated by the corresponding motor 212, 216 as DC power on the first DC node 208. The switch 218 is closed to permit the DC power to be input onto the regen inverter 214. The inverter 214 may be controlled by a PLC (not shown) to create the proper AC power for accelerating the electric machine 244 to store more kinetic energy. During such "storage" period of energy in the flywheel system 243, the switches 217, 240 are open.

The EPGD system 200 may also comprise an alternative electrical power generation system 253. The alternative electrical power generation system 253 may be an alternative electrical power generation source that is not a genset, for example. As illustrated, the alternative electrical power generation system 253 includes a heat-to-electrical current (H2I) converter 254. The H2I converter 254 may be positioned proximate a heat generating source, such as a flare stack (e.g., flare stack 170 in FIG. 1). Such H2I could also be associated with the heat generated by the exhaust gas of the genset(s) 202 and/or other heat-generating components. The H2I converter 254 converts heat to DC electrical power. The H2I converter 254 may be or comprise a solid-state converter capable of converting heat flux to a DC electrical current, such as a Peltier element. Such system provides DC power at low voltage. Furthermore, this DC voltage may vary depending on the available primary energy. Thus, this DC voltage is adapted to the proper level for adequate usage at the rig. This applies not just to H2I implementations, but also for other sources of low and variable DC power. An output node of the H2I converter 254 is electrically connected to a flare (FL) inverter 256 that inverts the DC electrical power generated by the H2I converter 254 into AC electrical power. The FL inverter 256 outputs the AC electrical power to a primary winding of a transformer 258. The transformer 258 can be an electromagnetic isolation transformer that maintains a voltage correspondence between the primary winding and the secondary winding of the transformer 258, and/or that can step up a voltage from the voltage supplied across the primary winding to the voltage provided across the secondary winding. The secondary winding of the transformer 258 is electrically coupled to the AC node 204. A PLC or other controller (not shown) may control the output of the FL inverter 256 and/or associated switches 259 of the secondary winding of the transformer 258 to insure the adequate matching of power output of this power system onto the AC node 204. Such monitoring may include voltage and current.

Although not shown in FIG. 2, the FL inverter 256 may also be connected to one or more battery to insure proper energy transfer from the battery to the FL inverter 256. The energy of such batteries may be connected to an inverter to generate AC power to be fed to the AC node 204.

Depending on its technology and construction, the H2I converter 254 may convert heat flux into electrical power or vice-versa (as is the case with a Peltier element). Because the H2I converter 254 is able to convert electrical power to heat, such device may be connected to the BR chopper 207 to dissipate brake power from the drawworks, such as during trip-ins or other scenarios when the heat source is not active at the H2I converter 254.

The alternative electrical power generation system 253 can comprise, be instead of, or include in addition to the H2I converter 254, a solar conversion system (e.g., including solar panels), a wind conversion system (e.g., including a wind turbine), and/or other example alternate energy generation systems.

The DF pumps 260 are electrically connected to the AC node 204. The DF pumps 260 may include a transformer (not shown) to step down a voltage of the AC node 204 to an operational voltage of the DF pumps 260, for example.

A small load 262 is also electrically connected to the AC node 204. The small load 262 may include a transformer (not shown) to step down a voltage of the AC node 204 to an operational voltage (e.g., 120 V AC) of the small load 262, for example. The small load 262 may include various control and/or communication components and/or other ancillary components that use electrical power, such as lights, heating-ventilation-air-conditioning (HVAC) of rooms or buildings, etc.

A person having ordinary skill in the art will readily understand modifications to the EPGD system 200 that may be made within the scope of the present disclosure. For example, when the gensets 202 are a large distance from the AC node 204, a step-up transformer and a step-down transformer may be disposed between the gensets 202 and the AC node 204 to reduce power dissipation and/or loss as a result of transmitting electrical power the large distance between the gensets 202 and the AC node 204 (or even part of the AC node 204, if split into more than one node). Various control and protection components, such as circuit breakers and controllers, may also be included in the EPGD system 200 for protection against faults.

A controller may control various aspects of the EPGD system 200 during various operations. A controller, such as illustrated in FIG. 10 and described below, can have indications of various voltages, currents, and rotational speeds as inputs, and can control voltages, frequencies, and phases of inverters, voltages of rectifiers, and states of switches. Indications of currents that can be input to the controller can include indications of (i) a current output from the main rectifier 206, (ii) a current between the TD inverter 210 and TD motor 212, (iii) a current between the DW inverter 214 and DW motor 216, (iv) a current through the chopper 222, (v) a current through the switch 217, and/or (vi) a current from the H2I converter 254. Indications of voltages that can be input to the controller can include indications of (i) a voltage of the AC node 204, (ii) a voltage of the first DC node 208, (iii) a voltage at the TD motor 212, (iv) a voltage at the DW motor 216, (v) a voltage at the second DC node 220, (vi) a voltage at the capacitor banks 223 (e.g., at a node between the chopper 222 and the capacitor banks 223), (vii) a voltage at the output node of the regen inverter 214, and/or (viii) a voltage at the output node of the FL inverter 245. A person having ordinary skill in the art will readily understand that when a current and/or voltage is described, such description may include three-phase currents and/or voltages, respectively, when such current and/or voltage is AC electrical power. Indications of rotational speeds that can be input to the controller can include indications of (i) a rotational speed of the TD motor 212, (ii) a rotational speed of the DW motor 216, and/or (iii) a rotational speed of the flywheel of the flywheel system 243.

Based on inputs to the controller, the controller can control the operation of various components. The controller can control the open and closed states of the switches and choppers of the system 200. The controller can further control the voltage, frequency, and, in some instances, phase, of AC electrical power output from the TD inverter 210, the DW inverter 214, the regen inverter 214, and the FL inverter 245. The controller can also control the voltage of DC electrical power output from the rectifiers 206, 247. The controller may also control the chopper 222 to transfer the proper DC power to a capacitor bank 223 during energy storage. The controller may also control the chopper 207 to control the DC power transfer to the brake resistor 208. The brake resistor 208 may be operated to dissipate power generated by a motor to ensure braking effect, such as the drawworks motor 216 when moving the load downward. Such energy dissipation through the brake resistor 208 may occur when storage of energy is not available or permitted (as may be already full). A person having ordinary skill in the art will readily understand how such components can be controlled using a controller as described herein.

During normal drilling operations, for example, the gensets 202 may generate electrical power that meets and/or slightly exceeds electrical power demands of the well construction system, e.g., from the TD motor 212, the DW motor 216, the DF pumps 260, and/or the small load 262. In some instances during these operations, the switches 217, 218 may be open such that no electrical power may be regenerated onto the AC node 204, such that the electrical power recovery and regeneration components are isolated from the remainder of the EPGD system 200. At other instances during these operations, the switch 218 may be closed while the switch 217 may be open, such that electrical power recovery and storage may occur. For example, excess electrical power available on the first and second DC nodes 208, 220, such as a result of excess generation by the gensets 202 and/or from temporary generation by the TD motor 212 and/or the DW motor 216, may be transferred to charge a capacitor bank 223 by the selective closing of the chopper 222. Excess electrical power available on the first and second DC nodes 208, 220 may also or instead be transferred to the flywheel system 243 for storing kinetic energy in the flywheel system 243 by inverting the DC power on the second DC node 220 to AC electrical power (via the FW inverter 245).

Energy may also be balanced between the various electrical power storage components. This may permit the optimum usage of each storage system, despite their different response characteristics, such as charge and discharge speed, number of charge/discharge cycles, and efficiency of keeping a charge versus time. For example, if a capacitor bank 223 is charged to a corresponding greater amount than the flywheel system 243, energy can be transferred from the capacitor bank 223 to the flywheel system 243. The switches 217, 218 can be open while the switch 239 is closed. The chopper 222 can selectively close to transfer DC electrical power from the capacitor bank 223 to the second DC node 220 (e.g., discharge the capacitor bank 223), that DC electrical power may be converted to AC electrical power by the regen inverter 245, and that AC electrical power may be provided to the flywheel system 243 for storage. Similarly, for example, if the flywheel system 243 is charged to a corresponding greater amount than a capacitor bank 223, energy can be transferred from the flywheel system 243 to the capacitor bank 223. The switches 217, 218, switch 239 can be open. The switch 240 is closed and the flywheel system 243 provides AC electrical power to the rectifier 247, which converts the AC electrical power into DC electrical power that is made available on the second DC node 220. The chopper 222 can selectively close to transfer DC electrical power from the second DC node 220 to a capacitor bank 223 (e.g., charge the capacitor bank 223). As explained above, the DC chopper 222 may discharge energy from a capacitor bank 223, and the rectifier 247 may discharge energy from the flywheel system 243 to generate DC power on the second DC node 220. Such DC power can be transferred onto the first DC node 208 via the switch 218. In other operation modes, the DC power of the second DC node 220 may be converted to AC power by the REGEN inverter 214 and fed onto the AC node 204 by closing the switch 217.

Figure 3:
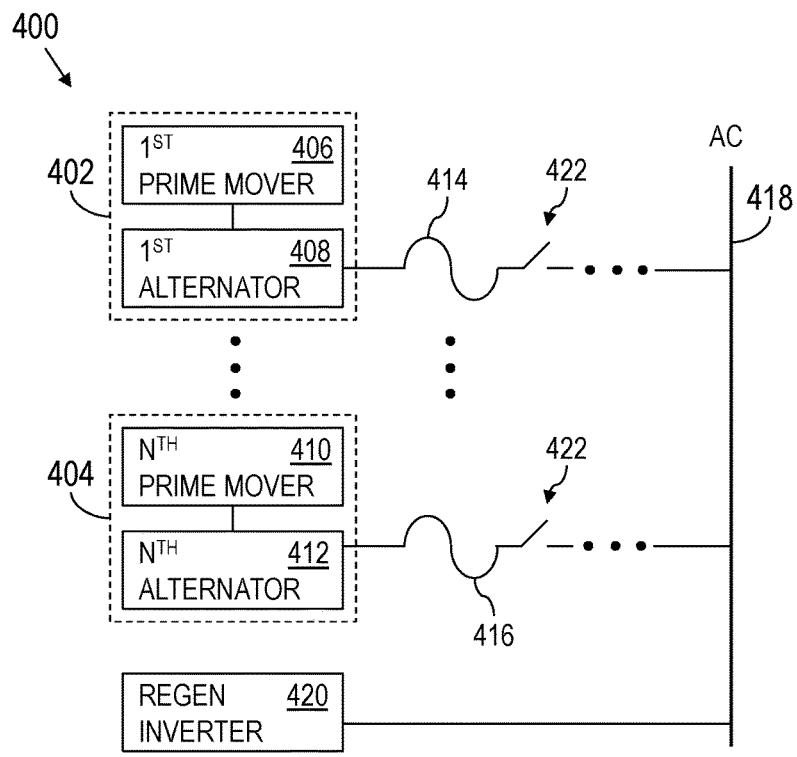
FIG. 3 is a schematic view of at least a portion of an example implementation of apparatus according to one or more aspects of the present disclosure.

FIG. 3 is a schematic view of at least a portion of an example implementation of an EPGD system 400 according to one or more aspects of the present disclosure. Portions of the schematic view may be in one-line schematic form, as described above. The EPGD system 400 includes electrical power generation and electrical power recovery and regeneration, and is illustrated and described as being in a low (e.g., "zero") power state.

The EPGD system 400 includes N gensets that includes a first genset 402 and an $N^{th}$ genset 404, with N being a number greater than one. The first genset 402 includes a first prime mover 406 with a drive shaft mechanically coupled to a first alternator 408, and the $N^{th}$ genset 404 includes an $N^{th}$ prime mover 410 with a drive shaft mechanically coupled to an $N^{th}$ alternator 412. Reference below to the first through $N^{th}$ gensets, prime movers, or alternators includes the first genset, prime mover, or alternator, the $N^{th}$ genset, prime mover, or alternator, and (if N is greater than two) the second through N-$1^{th}$ genset, prime mover, or alternator.

The first through $N^{th}$ prime movers 406, 410 may each be or include an engine, such as a diesel or natural gas engine, a turbine, and/or other example prime movers. The first through $N^{th}$ alternators 408, 412 may each be an alternator with a controllable input DC flux to control an amount of electrical power generated by that alternator. The first through $N^{th}$ alternators 408, 412 are driven by the respective first through $N^{th}$ prime movers 406, 410 to output electrical power, such as three-phase AC electrical power.

Outputs of the first through $N^{th}$ alternators 408, 412 are electrically connected to a respective one of a first breaker 414 through an $N^{th}$ breaker 416. The first through $N^{th}$ breakers 414, 416 may be high current breakers used for protection against surges in current. The first through $N^{th}$ breakers 414, 416 may be electrically coupled to a common AC node 418 directly or indirectly, such as the AC node 204 shown in FIG. 2. For example, one or more switches 422 may be electrically connected between each of the first through $N^{th}$ breakers 414, 416 and the AC node 418. In a low power state, switches and/or circuit breakers may be open to de-couple the one or more of the first through $N^{th}$ gensets 402, 404 from the AC node 418.

A regen inverter or a four-quadrant rectifier, collectively referred to below as simply the regen inverter 420 is electrically connected to the AC node 418. The regen inverter 420 can be, for example, the regen inverter 214 and/or the main rectifier 206 shown in FIG. 2. One or more flywheel systems, capacitor banks, and/or other energy storage means may supply electrical energy to the regen inverter 420. That electrical energy may then inverted to AC electrical energy with phase (e.g., for three-phase power), frequency, and voltage matching what is available on the AC node 418. The AC electrical power on the AC node 418 may then be used to supply power to, e.g., a small load, such as for controllers, computers, communication devices, etc., at the well site while drilling operations that may otherwise use a large amount of electrical power are idle. Hence, when a small amount of electrical power is used, flywheel systems, capacitor banks, and/or systems that recover and regenerate energy may be used to supply electrical power during low power states.

One or more controllers are operable to control the operation of the first through $N^{th}$ gensets 402, 404 and the regen inverter 420. Control inputs may include the voltage, current, frequency, and phase of AC electrical power at each of the first through $N^{th}$ alternators 408, 412. Such information may be utilized to ensure proper connection of each alternator on the AC node 418. Control inputs may also include the voltage, frequency, and phase of AC electrical power on the AC node 418, and/or indications of energy that has been stored, such as voltage at a capacitor bank and/or rotational speed of a flywheel.

One or more of the controllers related to the regen inverter 420 may control the voltage, frequency, and phase of the AC electrical power output by the regen inverter 420 to match the AC electrical power available on the AC node 418. One or more controllers related to engine management of the first through $N^{th}$ gensets (perhaps including one controller per engine) can control injection of fuel in the corresponding one of the first through $N^{th}$ prime mover 406, 410 to ensure that the engine operates at the intended speed. Each alternator output frequency is proportional to the speed of the alternator and drive engine. The injection rate is adjusted to vary engine torque, such as may be due to a variation of power demand at the alternator. One or more controllers related to the alternator management adjust the DC flux through the alternator to ensure that alternator provides the proper voltage output in relation to the rotation speed and the AC node 418.

By operating the gensets in such a manner, the controllers can keep the rotational speeds of the prime movers and alternators at a level such that the frequency, phase, and voltage of the alternators matches the frequency and phase of AC electrical power on the AC node 418. When connecting an additional genset on the AC node 418, the switch 422 for the added genset is initially open, the RPM is set slightly below the intended RPM, and the flux is set so that the alternator voltage matches the voltage on the AC node 418. The PLC waits until the phase of the alternator output temporality matches the phase on the AC node 418, and the corresponding switch 422 is closed so that the additional alternator phase is locked on the phase of the AC node 418. The flux of this alternator may be readjusted to ensure power generation, and the fuel injection may be simultaneously adapted to keep the engine at the intended RPM.

Figure 4:
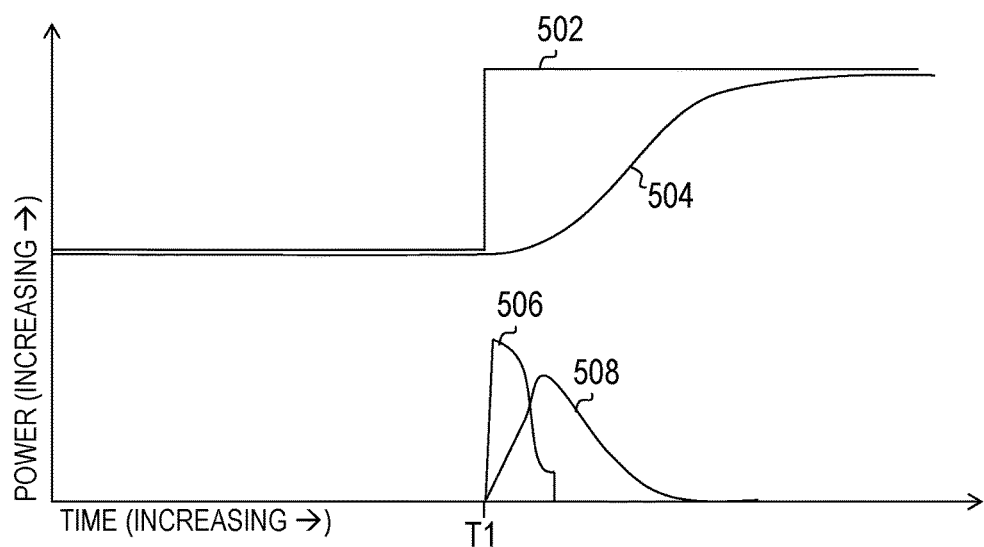
FIG. 4 is a graph depicting one or more aspects of the present disclosure.

Referring to the EPGD system 200 of FIG. 2, various switches may be open and closed during a low power state to implement the EPGD system 400 of FIG. 4. For example, the switches 218 and 239 may be open, while the switch 240 is closed. In this configuration, DC electrical power from a capacitor bank 223 may be discharged through the chopper 222 and inverted to AC electrical power through the regen inverter 214, and that AC electrical power may be made available to the AC node 204 through the switch 217. Similarly, the flywheel system 243 may be discharged by converting AC electrical energy from the electric machine 244 to DC electrical power through the FW rectifier 247, and that DC electrical power may be converted back to AC electrical power with proper phase, frequency, and voltage through the regen inverter 214, which AC electrical power may then be made available to the AC node 204 through the switch 217.

FIG. 4 is a graph depicting one or more aspects of the present disclosure, illustrating a transient event, which in the depicted example is a sudden increase in power demand. The aspects may be implemented in association with the EPGD system 200 shown in FIG. 2. Description of how the sudden increase in demand may be met by electrical power generation below can be applicable to meeting a deficit in electrical power generation relative to a demand by using power regeneration.

A demand 502 increases at time T1. While the gensets 202 may not be able to meet this sudden increase in demand 502 at time T1, the gensets 202 may be able to ramp up a generator supply 504 over a period of time following the time T1. Hence, a capacitor bank 223 and/or flywheel system 243 may supplement the power supply to facilitate meeting the change in demand 502. As illustrated, a capacitor supply 506 may be provided by discharging a capacitor bank 223 to provide a more instantaneous increase in supplied power. A flywheel supply 508 may be provided by discharging a flywheel system 243 to provide a more lasting power supply in comparison to the capacitor supply 506, e.g., until the generator supply 504 has ramped up to meet the demand 502. Hence, by combining the generator supply 504, the capacitor supply 506, and the flywheel supply 508, a sudden increase in demand of electrical power may be more readily satisfied or met.

Again referring to the EPGD system 200 of FIG. 2, various switches may be open and closed during a sudden increase in demand. Depending on what causes the sudden increase, different switches may be opened or closed. For example, if a consumer of power that consumes DC electrical power (e.g., the TD motor 212 and/or the DW motor 216 through respective inverters 210, 214) is the cause of the sudden increase in demand, the switch 218 may be closed while the switches 217 and 239 may be open. Similarly, if a consumer of power that consumes AC electrical power (e.g., the DF pumps 260 and/or the small load 262) is the cause of the sudden increase in demand, the switch 217 may be closed while the switches 218 and 239 may be open. If, for example, consumers of power, of which at least one consumes DC electrical power and at least one consumes AC electrical power, are the cause of the sudden demand, the switches 218 and switch 240 may be closed while the switch 239 may be open.

The chopper 222 can close upon the occurrence of the sudden demand increase to supply power from a capacitor bank 223 to the second DC node 220, and when the capacitor bank 223 is discharged to some amount, the chopper 222 can open to de-couple the capacitor bank 223 from the second DC node 220 such that the capacitor bank 223 does not supply electrical power to the second DC node 220. The flywheel system 243 can discharge energy by discharging AC electrical power from the electric machine 244 through the FW rectifier 247 to convert the AC electrical power to DC electrical power, which is then supplied to the second DC node 220. If DC electrical power is to be supplied to a consumer of DC electrical power, then switch 218 may be closed to provide the DC electrical power. If AC electrical power is to be supplied to a consumer of AC electrical power, then switch 217 may be closed such that DC electrical power on the second DC node 220 is inverted to AC electrical power with proper phase, frequency, and voltage through the regen inverter 214, and that AC electrical power may then be made available to the AC node 204 through the switch 217.

Additionally, the ramping up of the generator supply 504 in FIG. 4 may be based on emissions from the gensets 202 in FIG. 2. One or more controllers used in the EPGD system 200 can further have as inputs, for each genset, indications of emissions (e.g., exhausts) of the prime mover, such as nitrous oxide (NOx) and/or carbon monoxide (CO), and indications of rotational speed of the prime mover. Such controller(s) can further control the injection rate of fuel into the prime mover and DC flux through the alternator. The controller(s) can ramp up the gensets, and thus the generator supply 504, based on the emissions so that pollution can be reduced during the ramp up. By permitting the capacitor supply 506 and/or the flywheel supply 508 to meet the deficiency of power supply, the gensets can be ramped up smoothly and efficiently to reduce pollution generated by the prime movers.

Figure 5:
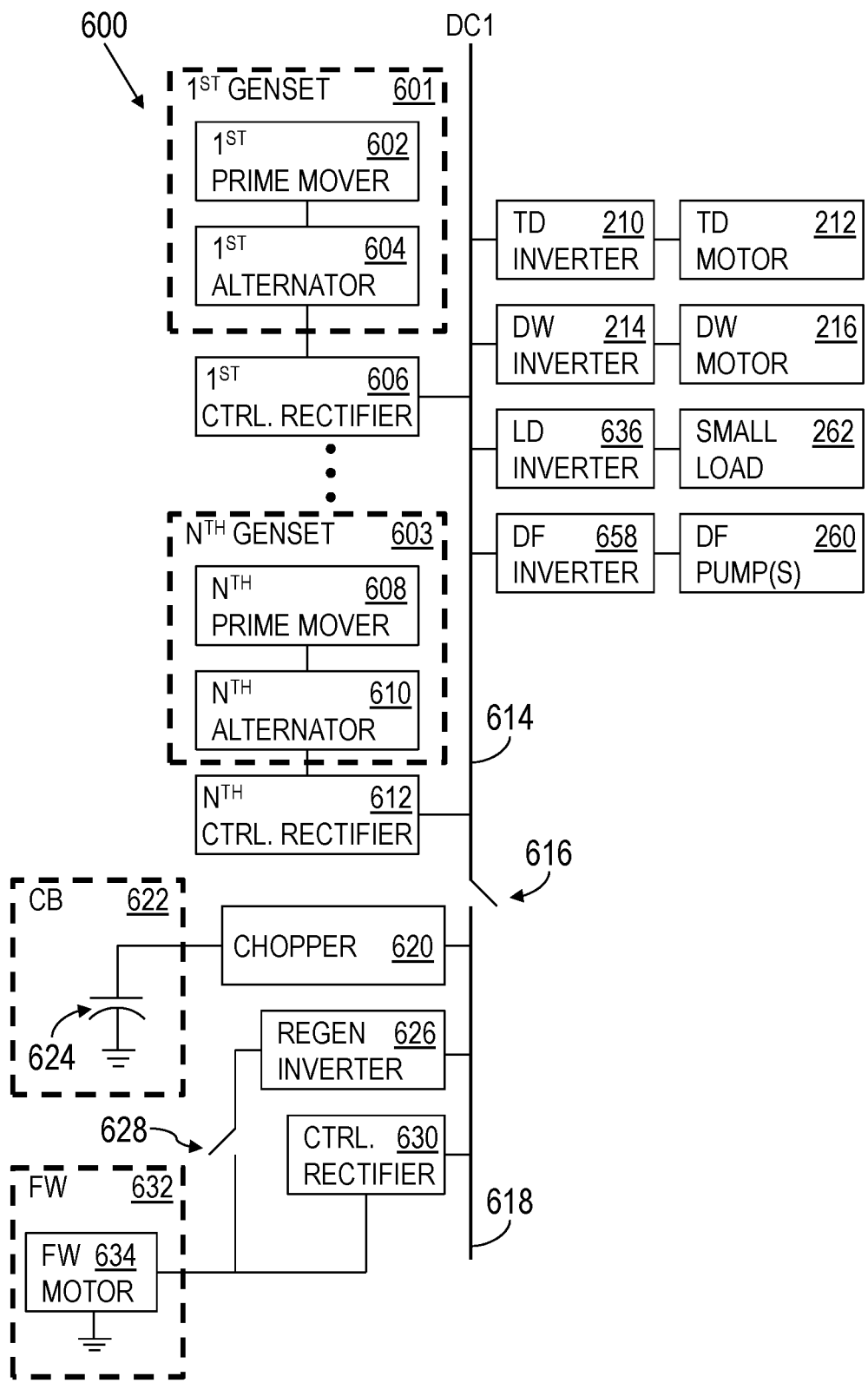
FIG. 5 is a schematic view of at least a portion of an example implementation of apparatus according to one or more aspects of the present disclosure.

FIG. 5 is a schematic view of at least a portion of an example implementation of an EPGD system 600 of a well construction system in accordance with one or more aspects of the present disclosure. The EPGD system 600 includes electrical power generation and electrical power recovery and regeneration. Portions of the schematic view may be in one-line schematic form. Some components in the EPGD system 600 are common to the EPGD system 200 shown in FIG. 2, which commonality is shown by common reference numerals. Reference is made to the description of FIG. 2 for these common components, and further description of these common components is omitted with respect to FIG. 6 for brevity.

The EPGD system 600 includes N gensets, with N being a number greater than one. A first genset 601 includes a first prime mover 602 operable to drive a first alternator 604, and an $N^{th}$ genset 603 includes an $N^{th}$ prime mover 608 operable to drive an $N^{th}$ alternator 610. Each prime mover and alternator may be similar to those described above with respect to FIG. 3. A first controlled rectifier 606 is electrically connected to and electrically disposed between an output node of the first alternator 604 and a first DC node 614, and an $N^{th}$ controlled rectifier 612 is electrically connected to and electrically disposed between an output node of the $N^{th}$ alternator 610 and the first DC node 614. Reference below to the first through $N^{th}$ gensets, prime movers, alternators, or rectifiers includes the first genset, prime mover, alternator, or rectifier, the $N^{th}$ genset, prime mover, alternator, or rectifier, and (if N is greater than two) the second through N−1th genset, prime mover, alternator, or rectifier. The first through $N^{th}$ controlled rectifiers 606, 612 convert AC electrical power output by the respective first through $N^{th}$ alternators 604, 610 to DC electrical power that is supplied to the first DC node 614. The first DC node 614 can be or include electrical cables, bus bars, a combination thereof, and/or other example conductive components.

Each controlled rectifier 606, 612 and the alternator settings (e.g., rotor flux) are adjusted so that an intended amount of power may be converted from AC to DC and transmitted to the first DC bus 614 at the intended DC voltage. For such power transfer control, one or more PLCs and/or other controllers (not shown) may monitor the power transfer via measurements of voltage on both sides of the rectifiers, as well as the transmitted current. With such control, one or more PLCs and/or other controllers may impose the proportion of power that each genset provides. In some scenarios, however, one or more of the gensets may be operating in such condition that it provides no power.

A switch 616 is electrically connected to and electrically disposed between the first DC node 614 and a second DC node 618. The switch 616 is operable to electrically couple and de-couple the first and second DC nodes 614, 618. The second DC node 618 can be or include electrical cables, bus bars, a combination thereof, and/or other example conductive components. As described below, the switch 616 is controlled to open and close based on various states of power consumption, recovery, and/or regeneration.

A chopper 620 is electrically connected to and electrically disposed between the second DC node 618 and a capacitor bank (CB) 622 that includes a capacitor 624. The chopper 620 may be like the chopper 222 in FIG. 2. The capacitor bank 622 in FIG. 6 is illustrated generically, but is understood to be similar to the capacitor bank(s) 223 of FIG. 2 and/or other capacitor banks within the scope of the present disclosure.

An input node of a regen inverter 626 is electrically connected to the second DC node 618, and an output node of a regen controlled rectifier 630 is electrically connected to the second DC node 618. The regen inverter 626 may be like the regen inverter 214 in FIG. 2, and the regen controlled rectifier 630 may be like the rectifier 247 in FIG. 2. An output node of the regen inverter 626 is electrically connected to a first node of a switch 628. As described below, the switch 628 is controlled to open and close based on various states of power consumption, recovery, and/or regeneration. An input node of the regen controlled rectifier 630 is electrically connected to a second node of the switch 628 and a flywheel system 632 that includes a flywheel motor 634. The flywheel system 632 in FIG. 5 may be like the flywheel system 243 in FIG. 2 and/or other flywheel systems within the scope of the present disclosure.

The TD inverter 210, the DW inverter 214, and the DF pump inverter 258 are electrically connected to the first DC node 614, such that the speed of the TD motor 212, the DW motor 216, and the DF pumps 260 can be controlled individually. An input node of a load (LD) inverter 636 is electrically connected to the first DC node 614, and an output node of the load inverter 636 is electrically connected to the small load 262. The load inverter 636 inverts the DC electrical power available at the first DC node 614 to AC electrical power that is output to the output node of the load inverter 636 to provide AC power at the small load 262 at an intended frequency (such as 50 or 60 Hertz).

Figure 6:
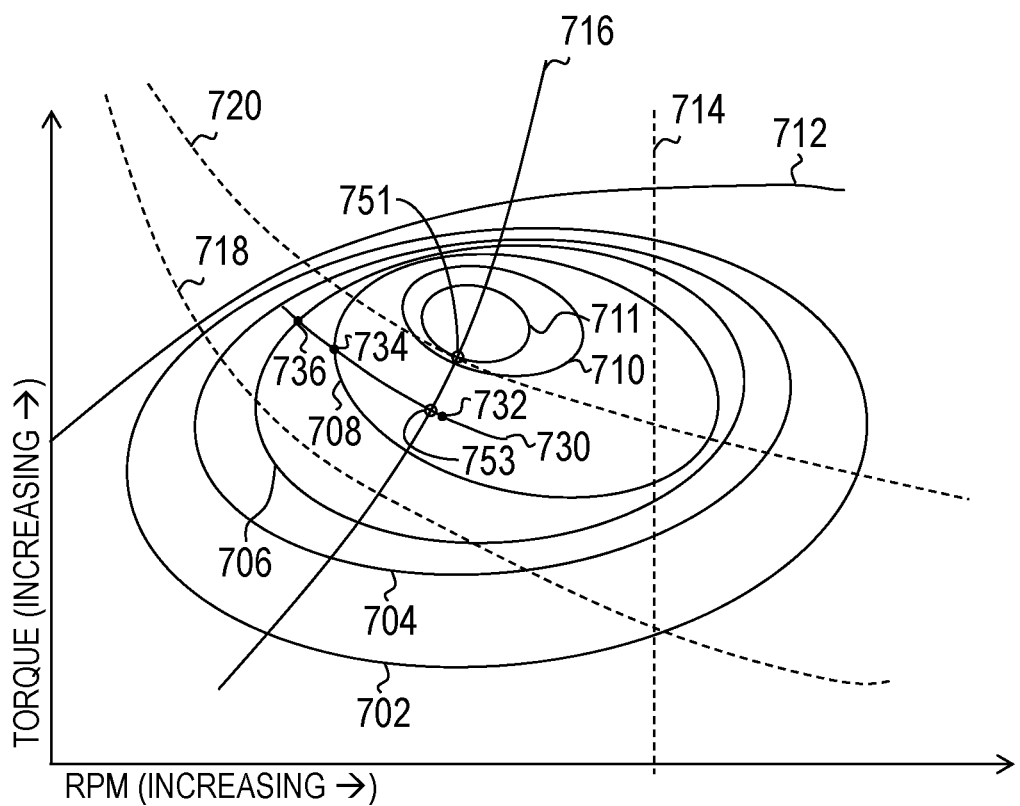
FIG. 6 is a graph depicting one or more aspects of the present disclosure.

The EPGD system 600 of FIG. 6 permits the gensets to be operated independently without regard to matching a frequency and/or phase of AC electrical power on a common AC electrical bus or node. Ac electrical power output from each genset is converted to DC electrical power by a respective rectifier without the AC electrical power being provided to a common AC electrical bus or node onto which multiple genset might provide AC electrical power. Hence, each genset can be brought online without matching a frequency and/or phase of some other AC electrical power. Each genset can have a prime mover operating at a rotational speed different from the other genset(s), for example. Voltages from the different combinations of a genset and respective rectifier can be matched, for example, by controlling DC flux through the respective alternators and/or by controlling firing delays of thyristor-based rectifiers.

One or more controllers may control various aspects of the EPGD system 600 during various operations, and each controller may be at least similar to at least a portion of the implementation depicted in FIG. 9 and described below. The one or more controllers can have indications of voltages, currents, rotational speeds, fuel consumption (perhaps instantaneous) and/or settings of an injection system of the prime movers, and/or emissions as inputs, and can control voltages, frequencies, voltages of rectifiers, states of switches, and phases of inverters. Indications of currents that can be input to the one or more controllers can include indications of (i) a current output from the first through $N^{th}$ controlled rectifiers 606, 612, (ii) a current between the first DC node 614 and the TD inverter 210, (iii) a current between the first DC node 614 and the DW inverter 214, (iv) a current between the first DC node 614 and the load inverter 636, (v) a current through the chopper 620, (vi) a current input to the regen inverter 626, and/or (vii) a current output from the regen controlled rectifier 630. Indications of voltages that can be input to the one or more controllers can include indications of (i) a voltage of the first DC node 614, (ii) a voltage of the second DC node 618, (iii) a voltage at the capacitor bank 622 (e.g., at a node between the chopper 620 and the capacitor bank 622), (iv) a voltage at the output node of the regen inverter 626, and/or (v) a voltage at the input node of the regen controlled rectifier 630. Indications of rotational speeds that can be input to the one or more controllers can include indications of (i) a rotational speed of the TD motor 212, (ii) a rotational speed of the DW motor 216, (iii) a rotational speed of the flywheel system 632, and/or (iv) a rotational speed of one or more of the first through $N^{th}$ prime movers 602, 608. Indications of emissions that can be input to the one or more controllers can include indications of concentrations of nitrous oxide (NOx) and/or carbon monoxide (CO) of one or more of the first through $N^{th}$ prime movers 602, 608.

Although not shown in FIG. 5, the one or more controllers may comprise a first PLC at the rig lever, a second PLC for the system of gensets, third PLCs each controlling one of the gensets, and fourth PLCs each controlling one of the motors 212, 216 or one of the pumps 260. The first PLC can control the open and closed states of the chopper 620 and the switches 616, 628. The first PLC (or fifth PLCs each controlling one of the inverters 210, 214, 626, 636, 658) can further control the voltage, frequency, and perhaps phase of AC electrical power output from the inverters 210, 214, 626, 636, 658. The first PLC (or sixth PLCs each controlling one of the first through $N^{th}$ rectifiers 606, 612 or the rectifier 630) can also control the voltage of DC electrical power output from the first through $N^{th}$ rectifiers 606, 612 and the rectifier 630, including controlling a firing delay of each rectifier. The third PLCs each control the fuel injection into the first through $N^{th}$ prime movers 602, 608, the first through $N^{th}$ alternators 604, 610, and the DC flux through the first through $N^{th}$ rectifiers 606, 612. A person having ordinary skill in the art will readily understand how such components can be controlled using PLCs and/or other controllers as described herein.

The EPGD system 600 of FIG. 5 can permit recovery or storing of power, and balancing of stored energy between the capacitor bank 622 and flywheel system 632, as described above with respect to FIG. 2. The voltages, charging, discharging, and other operation of the capacitor(s) 624 in the capacitor bank 622 can be adjusted as described above with respect to FIG. 2. The capacitor bank 622 and the flywheel system 632 may supply electrical power in a low power state as described with respect to FIG. 2. Power regeneration may occur in the EPGD system 600 of FIG. 5 as described above with respect to FIG. 2 when a consumer of power consumes DC electrical power.

It is noted that voltage at the energy storage device or medium during the "discharge" process is higher than the voltage during the "charge" process. When utilizing a capacitor bank, voltage levels may be controlled by switching the capacitors between parallel and series connections, as described above. When utilizing a flywheel, voltage levels may be controlled via an inverter by increasing or decreasing (e.g., progressively or in one or more steps) a drive frequency of an associated motor. For example, the inverter may create higher drive frequency to accelerate the flywheel to a higher rotational speed and, thus, store a higher level of energy, which may be discharged at a higher voltage. However, acceleration of the flywheel may be limited to change the speed of the flywheel, as the drive voltage of the inverter is limited by rectified voltage at the input to the inverter. Thus, the rectified voltage and/or the drive voltage may be boosted, for example, via a transformer. Accordingly, relative voltages of the power recovery and regeneration system affect the process of transferring stored energy from the capacitor bank to the flywheel and finally to the DC bus at an intended voltage.

With the prime movers being permitted to operate at different rotational speeds, the prime movers can individually be operated to minimize fuel consumption and/or reduce emissions. FIG. 6 is an example graph illustrating efficiency curves for power curves of a prime mover according to one or more aspects of the present disclosure. The closed curves 702, 704, 706, 708, 710, 711 illustrate increasing levels of brake specific fuel consumption (BSFC), from a lowest BSFC 702 to a highest BSFC 711. A maximum operational curve 712 is illustrated, and a constant rotational speed reference line 714 is also illustrated. The line 714 shows how operating a prime mover at a same rotational speed with varying torque can have varying BSFC.

Two power operating lines 718 and 720 (and even 730) are also shown that illustrate two (or three) constant powers as functions of torque and rotational speed of the prime mover. For a given rig operation, a level of power may be required so that the engine may have to operate following a constant power line (such as 720). For each constant power line, there is a point of highest efficiency that corresponds to the intersection of the highest BSFC and that power curve, such as the point of highest efficiency 751 at the intersection of the highest BSFC 711 and the power curve 720. When considering power levels, a highest efficiency line 716 for operating the prime mover is also illustrated.

Operating a prime mover along the highest efficiency line 716 can result in optimized performance of the prime mover. For example, less fuel can be consumed, which can further result in less pollution from emissions from the prime mover. Further, for some power demands, lower rotational speed can be used, which can reduce wear of the prime mover. Also, the prime mover may have less heat generated as a result of the improved efficiency, which can reduce aging of the prime mover.

The controller that controls the operation of the prime mover can have inputs indicating the fuel consumption (e.g., injector drive process), rotational speed, and/or torque of the prime mover, and indicating the voltage and/or current (e.g., power) output by the alternator. The well construction apparatus has a demand, which may in turn determine how much electrical power that the genset will produce to meet the demand. This power to be produced by the genset can be illustrated as power line 730 in FIG. 7. The controller selects a first operational point (e.g., first point 732) along the power line 730 near or at the highest efficiency line 716. The controller sets the genset to the first operational point and permits the genset to reach steady state. At steady state, the controller determines the efficiency of the genset based on the inputs to the controller. The controller then iteratively selects other operational points (e.g., second point 734 and third point 736) along the power line 730, and at each point, the controller permits the genset to reach steady state to determine the efficiency of the genset. After testing multiple points along the power line 730, the controller determines which of the points has the highest efficiency, and sets the prime mover to the operational point having the highest efficiency (e.g., 753). If the controller has a predefined sets of B SGC curves and the curve of highest efficiency, the selection of the operation point 753 can be immediate. As there may be multiple gensets available in the well construction system, the controller may operate different gensets at different operating points to ensure the global efficiency at the system level is obtained.

Figure 7:
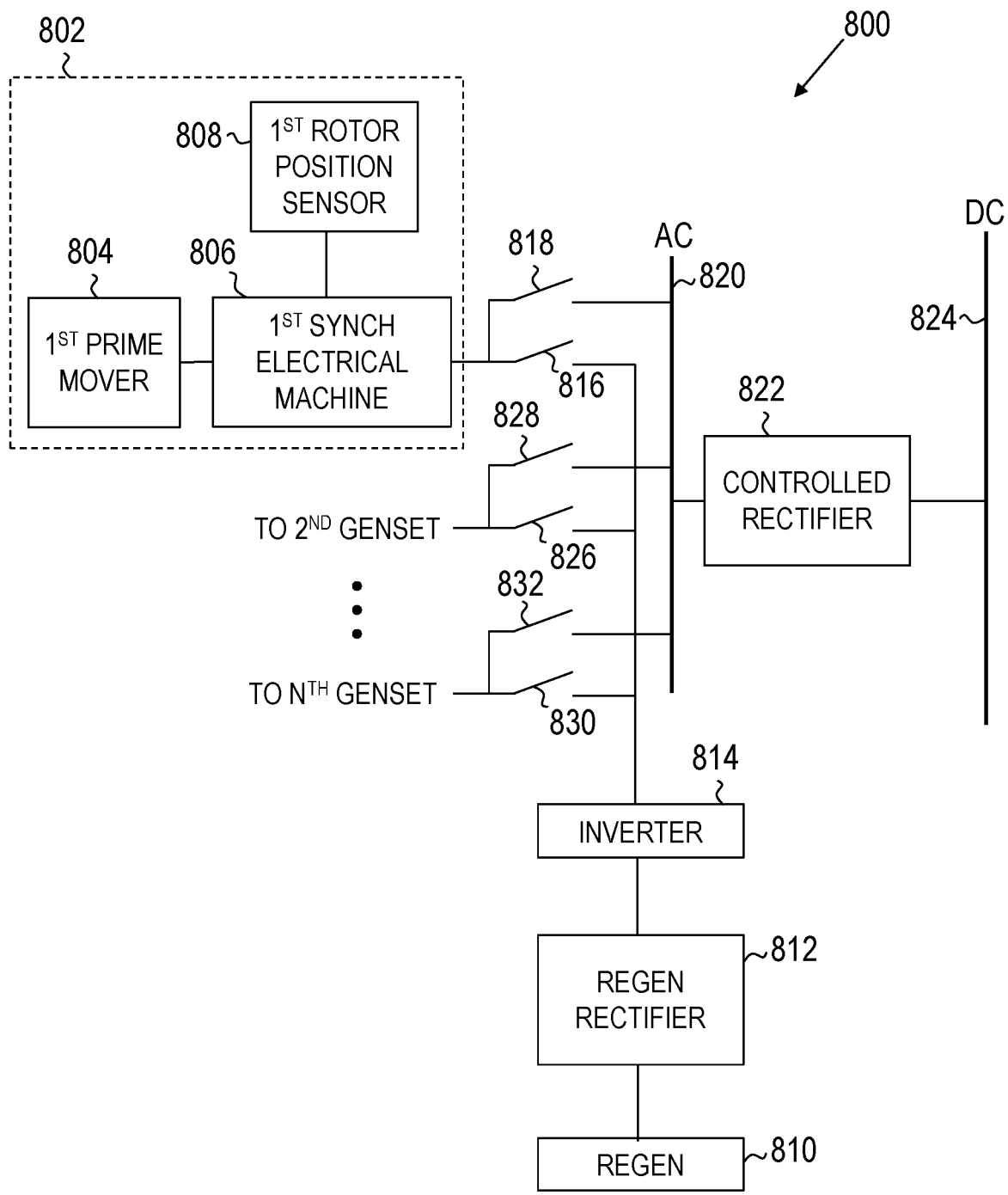
FIG. 7 is a schematic view of at least a portion of an example implementation of apparatus according to one or more aspects of the present disclosure.

FIG. 7 is a schematic view of at least a portion of an example implementation of an EPGD system 800 of a well construction system in accordance with one or more aspects of the present disclosure. The EPGD system 800 includes electrical power generation and electrical power recovery and regeneration. Portions of the schematic view may be in one-line schematic form.

The EPGD system 800 includes multiple gensets, including a first genset 802, as well as second through $N^{th}$ gensets that are schematically depicted in FIG. 7. The first genset 802 includes a first prime mover 804, such as an engine, like a diesel-powered or natural gas engine, and/or other example prime movers. The prime mover drives a first synchronous (SYNCH) electrical machine 806, which may be an alternator, for example. The first genset 802 further includes a first rotor position sensor 808. The first rotor position sensor 808 is operable to determine a position of the rotor of the first synchronous electrical machine 806. The second through $N^{th}$ gensets include prime movers, synchronized electrical machines, and rotor position sensors.

The EPGD system 800 includes one or more regen equipment 810 associated with an energy storage system such as the capacitor bank 223 and/or flywheel system 243 in FIG. 2. The regen equipment 810 is electrically connected to a regen rectifier 812. The regen equipment 810 is electrically connected to a regen inverter 814 (such as the regen inverter 214 in FIG. 2), such as when the regen equipment 810 includes the flywheel system. Some regen equipment, such as a capacitor bank or battery bank, may be electrically connected to the inverter 814 without a regen rectifier, e.g., since DC electrical power is provided by the capacitor bank or battery. A person having ordinary skill in the art will readily understand how various switches in the systems of FIG. 2 would be opened and closed to implement the connections illustrated in FIG. 7.

An output node of the regen inverter 814 is electrically connected to a first node of a switch 816, and a second node of the switch 816 is electrically connected to a second node of a switch 818 and an input/output node of the first synchronous electrical machine 806. A first node of the switch 818 is electrically connected to an AC node 820, such as the AC node 204 in FIG. 2. A controlled rectifier 822, such as the main rectifier 206 in FIG. 2, is electrically connected to and electrically disposed between the AC node 820 and a DC node 824, such as the first DC node 208 in FIG. 2.

Because there are multiple gensets, switches electrically connected between a respective genset and the regen inverter 814, and between the respective genset and the AC node 820, can be implemented as described with respect to the switches 816, 818, and as illustrated by the switches 826, 828 electrically connected to a second genset and the switches 830, 832 electrically connected to the $N^{th}$ genset.

The EPGD system 800 in FIG. 7 may be implemented to bring one or more gensets online (from stop condition) to the power distribution system 800 quickly, e.g., a "fast start." The "fast start" of the additional genset is obtained by using the corresponding synchronous machine as a BLDC motor associated with the corresponding rotor position sensor, the VFD and the controller to properly switch the current in the three phases of the synchronous machine while maintaining the optimum DC flux in the rotor. With such method, the large size electrical machine 806 can rotate the engine to start it and quickly bring it to the intended speed for synchronization onto the network. Furthermore, the control insures that the synchronous machine is in phase before changing the operation mode of this synchronous machine from motor to generator. A controller has as inputs a demand, such as from a job plan and/or command resulting from a human-machine interface (HMI), the rotational speed of the prime mover, the rotor position of the synchronous electrical machine as determined by the rotor position sensor, the voltage and current at the machine phase windings, the DC current into the rotor flux winding of the synchronous electrical machine, and an indication of the stored energy in the regen equipment 810, such as a rotational speed of a flywheel system, voltage at a capacitor bank, and/or energy in a battery bank. The controller has as outputs respective control signals to open and close the switches 816, 818, 826, 828, 830, and 832, to control the regen rectifier 812 to control a DC voltage output, to control the regen inverter 814 to control the voltage, frequency, and phase of an AC power output from the regen inverter 814, to control injection of fuel to the prime movers (perhaps via additional controllers specific to each prime mover), to control a DC flux in the synchronous electrical machines, and to control the controlled rectifier 822 to control a DC voltage output to the DC node 824.

For example, if the first genset 802 is to be brought online while one or more other gensets are already online and generating power. Switch 816 is closed and switches 818, 826, and 830 are opened. The switches 828, 832 may be left to previously selected modes, such that the corresponding gensets may continue to provide power. The regen rectifier 812 and the regen inverter 814 are then controlled based on the rotor position determined by the first rotor position sensor 808, such that the AC power output from the regen inverter 814 permits driving the synchronous machine as a BLDC motor in relation to the current rotor position and the intended output torque and speed. The AC power output from the regen inverter 814 is then supplied to the first synchronous electrical machine 806 through the closed switch 816, and the first synchronous electrical machine 806 is used as a motor (starter) to rotate the engine and permit engine running operation by proper fuel injection, and also bring the first prime mover 804 up to the intended RPM speed corresponding to the intended electrical output. Due to the rotor position sensor of each machine, the phase of the rotor of this electrical machine 806 may be aligned on the other rotor position to allow generator synchronization The DC flux in the first synchronous electrical machine 806 and the injection of fuel to the first prime mover 804 in bringing the first prime mover 804 up are also controlled to generate the proper torque at the first synchronous electrical machine 806 during motor operation.

When the first prime mover 804 is brought up to speed, the first synchronous electrical machine 806 may be changed from motor mode to generator mode by disconnecting the inverter 814 by opening the switch 816. Then the switch 818 is closed. Power generated by the first genset 802 is then supplied to the common AC node 820. The rectifier 822 may also be controlled to control a DC voltage output to the DC node 824.

Figure 8:
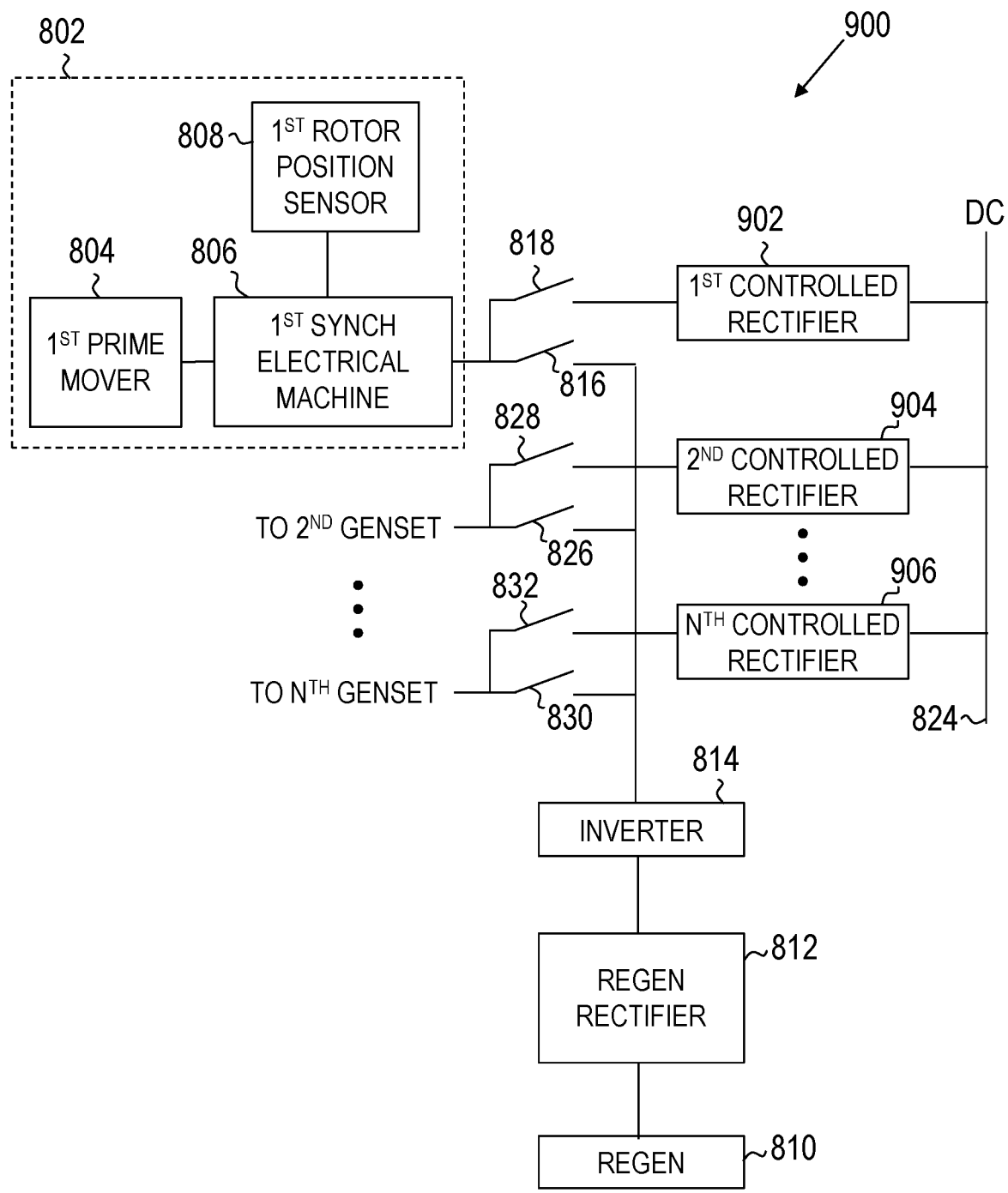
FIG. 8 is a schematic view of at least a portion of an example implementation of apparatus according to one or more aspects of the present disclosure.

FIG. 8 is a schematic view of at least a portion of an example implementation of an EPGD system 900 of a well construction system in accordance with one or more aspects of the present disclosure. The EPGD system 900 includes electrical power generation and electrical power recovery and regeneration. Portions of the schematic view may be in one-line schematic form. Some components in the EPGD system 900 are common with the EPGD system 800 in FIG. 7, which commonality is shown by common reference numerals. Reference is made to the description of FIG. 7 for these common components, and further description of these common components is omitted with respect to FIG. 8 for brevity.

The EPGD system 900 may not have a common AC node or bus, such as the implementation depicted in FIG. 5. The respective second nodes of the switches 818, 828, 832 are electrically connected to a respective first controlled rectifier 902, second controlled rectifier 904, and $N^{th}$ controlled rectifier 906. Hence, when each genset is generating, the AC power output from each genset can be individually converted to DC power. In such implementations, each genset can be brought up to speed as described above with respect to the EPGD system 800 of FIG. 7 without reference to a frequency or phase of an AC power because the output of each genset is individually converted to DC power.

The synchronous electrical machines in FIGS. 7 and 8 can be used as alternators to generate AC electrical power, and as DCBL motors to start the corresponding prime movers. By using the synchronous electrical machine as a DCBL motor, the prime mover can be started and brought to a nominal operation speed in a short amount of time. A power distribution system of a well construction system can operate with a minimum number of gensets operating to meet the demand of the well construction system. When demand is increased, power can be regenerated by a flywheel system, capacitor bank, and/or battery bank as described above, and the flywheel system and/or capacitor bank may be used as a power source to start up one or more gensets quickly, as described in FIGS. 7 and 8, such that the gensets can be quickly brought online to meet the increased demand. In some instances, prime movers of offline or inactive gensets can be kept warm by heat available from cooling fluid of prime movers of active or online gensets. Lubrication systems of offline prime movers or inactive gensets may also remain active to keep those prime movers lubricated.

Figure 9:
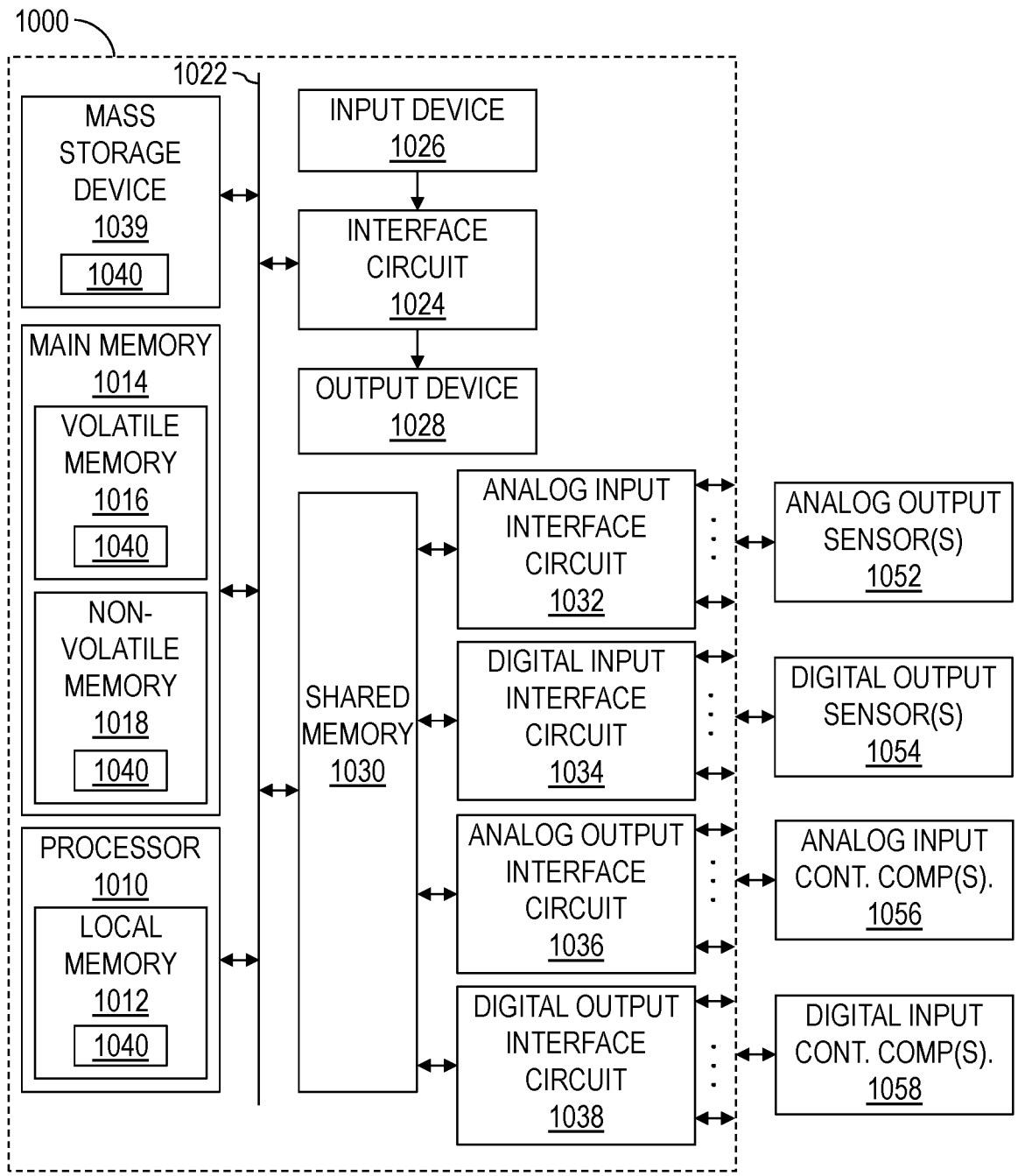
FIG. 9 is a schematic view of at least a portion of an example implementation of apparatus according to one or more aspects of the present disclosure.

FIG. 9 is a schematic view of at least a portion of an example implementation of a controller, e.g., a processing system 1000, according to one or more aspects of the present disclosure. The processing system 1000 may execute example machine-readable instructions to implement at least a portion of an equipment controller that may implement control as described herein. The processing system 1000, or portions thereof, may implement various ones of the PLCs and controllers described above.

The processing system 1000 may be or comprise, for example, one or more processors, controllers, programmable logic controllers (PLCs), industrial computers, personal computer based controllers, soft PLCs, special-purpose computing devices, servers, personal computers, and/or other types of computing devices. Moreover, while it is possible that the entirety of the processing system 1000 shown in FIG. 9 is implemented within one device, it is also contemplated that one or more components or functions of the processing system 1000 may be implemented across multiple devices, some or an entirety of which may be at the well site and/or remote from the well site.

The processing system 1000 comprises a processor 1010 such as, for example, a general-purpose programmable processor. The processor 1010 may comprise a local memory 1012, and may execute program code instructions 1040 present in the local memory 1012 and/or in another memory device. The processor 1010 may execute, among other things, machine-readable instructions or programs to implement logic for monitoring and/or controlling one or more components of a well construction system. The programs stored in the local memory 1012 may include program instructions or computer program code that, when executed by an associated processor, enable monitoring and/or controlling one or more components of a well construction system. The processor 1010 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 1010 may be in communication with a main memory 1014, such as via a bus 1022 and/or other communication means. The main memory 1014 may comprise a volatile memory 1016 and a non-volatile memory 1018. The volatile memory 1016 may be, comprise, or be implemented by a tangible, non-transitory storage medium, such as RAM, SRAM, SDRAM, DRAM, RDRAM, and/or other types of random access memory devices. The non-volatile memory 1018 may be, comprise, or be implemented by a tangible, non-transitory storage medium, such as read-only memory, flash memory and/or other types of memory devices. One or more memory controllers (not shown) may control access to the volatile memory 1016 and/or the non-volatile memory 1018.

The processing system 1000 may also comprise an interface circuit 1024, which is in communication with the processor 1010, such as via the bus 1022. The interface circuit 1024 may be, comprise, or be implemented by various types of standard interfaces, such as an Ethernet interface, a universal serial bus (USB), a peripheral component interconnect (PCI) interface, and a third-generation input/output (3GIO) interface, among other examples. One or more other processing systems may be communicatively coupled to the interface circuit 1024, e.g., via a network. The interface circuit 1024 can enable communications between the processing system 1000 and one or more other processing system by enabling one or more communication protocols, such as any Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 1026 may be connected to the interface circuit 1024. One or more of the input devices 1026 may permit a user to enter data and/or commands for utilization by the processor 1010. Each input device 1026 may be, comprise, or be implemented by a touchscreen, a keypad, a joystick, one or more control switches or toggles, and/or one or more buttons, among other examples.

One or more output devices 1028 may also be connected to the interface circuit 1024. One or more of the output device 1028 may be, comprise, or be implemented by a display device, such as a LCD, and/or a LED display, among other examples. The interface circuit 1024 may also comprise a graphics driver card to enable used of a display device as one or more of the output device 1028. One or more of the output devices 1028 may also or instead be, comprise, or be implemented by one or more individual LEDs, a printer, speaker, and/or other examples.

The processing system 1000 may comprise a shared memory 1030, which is in communication with the processor 1010, such as via the bus 1022. The shared memory 1030 may be, comprise, or be implemented by a tangible, non-transitory storage medium, such as RAM, SRAM, SDRAM, DRAM, RDRAM, and/or other types of random access memory devices.

The processing system 1000 may comprise one or more analog input (AI) interface circuits 1032, one or more digital input (DI) interface circuits 1034, one or more analog output (AO) interface circuits 1036, and/or one or more digital output (DO) interface circuits 1038, each of which are in communication with the shared memory 1030. The AI interface circuit 1032 can include one or multiple inputs and can convert an analog signal received on an input into digital data useable by the processor 1010, for example. The DI interface circuit 1034 can include one or multiple inputs and can receive a discrete signal (e.g., on/off signal), which may be useable by the processor 1010. The AI interface circuit 1032 and DI interface circuit 1034 are communicatively coupled to the shared memory 1030, where the AI interface circuit 1032 and DI interface circuit 1034 can cache and/or queue input data and from which the processor 1010 can access the data. The inputs of the AI interface circuit 1032 and DI interface circuit 1034 are communicatively coupled to outputs of various sensors (e.g., analog output sensor 1052 and digital output sensor 1054), devices, components, etc. in a well construction system. Example sensors can include voltage transducers (e.g., potential transformers), current transducers (e.g., current transformers), rotor position sensors, rotational speed sensors, etc. The AI interface circuit 1032 and DI interface circuit 1034 can be used to receive, interpret, and/or reformat sensor data and monitor the status of one or more components, such as by receiving analog signals and discrete signals, respectively, of the various sensors, devices, components, etc. in the well construction system.

The AO interface circuit 1036 can include one or multiple outputs to output analog signals, which can be converted from digital data provided by the processor 1010 and temporarily stored in the shared memory 1030, for example. The DO interface circuit 1038 can include one or multiple outputs and can output a discrete signal (e.g., on/off signal), which may be provided by the processor 1010 and temporarily stored in the shared memory 1030, for example. The AO interface circuit 1036 and DO interface circuit 1038 are communicatively coupled to the shared memory 1030. The outputs of the AO interface circuit 1036 and DO interface circuit 1038 are communicatively coupled to inputs of various devices, components, etc., such as one or more analog input controllable components 1056 and/or digital input controllable components 1058, in a well construction system. Example controllable components include switches, controllable rectifiers, inverters, injection controls for prime movers, DC flux control for alternators, etc. The AO interface circuit 1036 and DO interface circuit 1038 can be used to control the operation of one or more components, such as by providing analog signals and discrete signals, respectively, to the various devices, components, etc. in the well construction system.

The processing system 1000 may also comprise a mass storage device 1039 for storing machine-readable instructions and data. The mass storage device 1039 may be connected to the processor 1010, such as via the bus 1022. The mass storage device 1039 may be or comprise a tangible, non-transitory storage medium, such as a floppy disk drive, a hard disk drive, a CD drive, and/or DVD drive, among other examples. The program code instructions 1040 may be stored in the mass storage device 1039, the volatile memory 1016, the non-volatile memory 1018, the local memory 1012, a removable storage medium, such as a CD or DVD, and/or another storage medium.

The modules and/or other components of the processing system 1000 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces an apparatus comprising a well construction system comprising: (A) motor equipment comprising at least one of: a drawworks motor, a top drive motor, or a combination thereof; and (B) an electrical power system comprising: (1) a generator-set operable to generate AC electrical power that is output at a generator node of the generator-set; (2) a rectifier, wherein: (i) an input node of the rectifier is coupled to the generator node during a generation state of the generator-set; (ii) the rectifier is operable to convert AC electrical power received at the input node of the rectifier to DC electrical power that is output to an output node of the rectifier; and (iii) the output node of the rectifier is coupled to a DC node; (3) at least one inverter electrically coupled between the DC node and the motor equipment, wherein the at least one inverter is operable to: (i) invert DC electrical power received from the DC node to AC electrical power that is provided to the motor equipment; and (ii) convert AC electrical power generated by the motor equipment to DC electrical power that is provided to the DC node; and (4) a power recovery and regeneration system electrically coupled to the DC node during a recovery state and during a regeneration state, wherein the power recovery and regeneration system comprises a first energy storage device and a second energy storage device, wherein the first energy storage device is connected in parallel with the second energy storage device during a charge state, wherein the first energy storage device is connected in series with the second energy storage device during a discharge state, and wherein at least one of the first and second energy storage devices does not comprise a capacitor bank.

At least one of the first and second energy storage devices may comprise a battery, a flywheel, and/or a combination thereof.

The motor equipment may comprise the drawworks motor and the top drive motor, the at least one first inverter may comprise a drawworks inverter and a top drive inverter, the drawworks inverter may be coupled between the first DC node and the drawworks motor, and the top drive inverter may be coupled between the first DC node and the top drive motor.

The first generator node may be coupled to an AC node, the well construction system may comprise a drilling fluid pump and a small load, an electrical system of the drilling fluid pump may be coupled to the AC node, and an electrical system of the small load may be coupled to the AC node The first generator node may be coupled to an AC node, and the electrical power system may comprise an alternative electrical power generation system coupled to the AC node. The alternative electrical power generation system may comprise a heat-to-electrical current converter, a solar panel, a wind turbine, and/or combinations thereof.

One the first and second energy storage devices may be a battery, and the other of the first and second energy storage devices may be a flywheel.

The first energy storage device may comprise a first battery and the second energy storage device may comprise a second battery. The first battery may be electrically isolated from the second battery during an adjustment state to the first battery, and the second battery may be electrically isolated from the first battery during an adjustment state to the second battery.

The first energy storage device may comprise a first flywheel motor, and the second energy storage device may comprise a second flywheel motor.

The power recovery and regeneration system may comprise: a second DC node; a second rectifier having an output node coupled to the second DC node; and a second inverter having an input node coupled to the second DC node, wherein one of the first and second energy storage devices may comprise a flywheel. The power recovery and regeneration system may be operable to configure, during the recovery state: the second DC node electrically coupled to the first DC node; and an output node of the second inverter electrically coupled to the flywheel, wherein the second inverter may operable to invert DC electrical power available on the second DC node to AC electrical power that is provided to the flywheel. The power recovery and regeneration system may be operable to configure, during the regeneration state: the second DC node electrically coupled to the first DC node; and an input node of the second rectifier electrically coupled to the flywheel, wherein the second rectifier may be operable to convert AC electrical power from the flywheel to DC electrical power that is provided to the second DC node. The generator node may be coupled to an AC node, the input node of the first rectifier may be coupled to the AC node, an AC electrical power consumer may be coupled to the AC node, and the power recovery and regeneration system may be operable to configure, during the regeneration state, the output node of the second inverter electrically coupled to the AC node. The generator node may be coupled to an AC node, the input node of the first rectifier may be coupled to the AC node, an AC electrical power consumer may be coupled to the AC node, and the power recovery and regeneration system may be operable to configure, during a second regeneration state: the second DC node electrically de-coupled from the first DC node; the input node of the second rectifier electrically coupled to the flywheel, wherein the second rectifier may be operable to convert AC electrical power from the flywheel to DC electrical power that is provided to the second DC node; and the output node of the second inverter electrically coupled to the AC node, wherein the second inverter may be operable to invert the DC electrical power available on the second DC node to AC electrical power that is provided to the AC node.

At least one of the first and second energy storage devices may be a flywheel operatively connected with the motor equipment, and the inverter may be operable to increase frequency of the AC electrical power that is provided to the motor equipment to increase the rotational speed of the flywheel and thus increase amount of energy stored by the flywheel.

The power recovery and regeneration system may comprise: a second DC node; a second inverter having an input node coupled to the second DC node; a third DC node; a second rectifier having an output node coupled to the third DC node; and a transformer, wherein at least one of the first and second energy storage devices may be a flywheel. The power recovery and regeneration system may be operable to configure, during the first recovery state: the second DC node electrically coupled to the first DC node; an output node of the second inverter electrically coupled to a primary winding of the transformer, wherein the second inverter may be operable to invert DC electrical power available on the second DC node to AC electrical power that is provided to the primary winding of the transformer; and a secondary winding of the transformer electrically coupled to the flywheel. The power recovery and regeneration system may be operable to configure, during the first regeneration state: the second DC node electrically coupled to the first DC node; the third DC node electrically coupled to the second DC node; and an input node of the second rectifier electrically coupled to the flywheel, wherein the second rectifier may be operable to convert AC electrical power from the flywheel to DC electrical power that is provided to the third DC node. The transformer may have multiple taps on the secondary winding, each of the multiple taps may have a different ratio of number of windings of the primary winding to number of windings of the secondary winding, and the power recovery and regeneration system may be operable to, during the first recovery state, selectively couple one of the multiple taps of the secondary winding to the flywheel. The first generator node may be coupled to an AC node, the input node of the first rectifier may be coupled to the AC node, an AC electrical power consumer may be coupled to the AC node, and the power recovery and regeneration system may be operable to configure, during the first regeneration state, the output node of the second inverter electrically coupled to the AC node. The first generator node may be coupled to an AC node, the input node of the first rectifier may be coupled to the AC node, an AC electrical power consumer may be coupled to the AC node, and the power recovery and regeneration system may be operable to configure, during a second regeneration state: the second DC node electrically de-coupled from the first DC node; the third DC node electrically coupled to the second DC node; the input node of the second rectifier electrically coupled to the flywheel, wherein the second rectifier may be operable to convert AC electrical power from the flywheel to DC electrical power that is provided to the third DC node; and the output node of the second inverter electrically coupled to the AC node, wherein the second inverter may be operable to invert the DC electrical power available on the second DC node to AC electrical power that is provided to the AC node.

The electrical power system may comprise: a second generator-set operable to generate AC electrical power that is output at a second generator node of the second generator-set; and a second rectifier. An input node of the second rectifier may be coupled to the second generator node during a generation state of the second generator-set, the second rectifier may be operable to convert AC electrical power received at the input node of the second rectifier to DC electrical power that is output to an output node of the second rectifier, and the output node of the second rectifier may be coupled to the first DC node. The first generator-set and the second generator-set may be operable to generate AC electrical power at different frequencies when the first generator-set and the second generator-set are generating AC electrical power input to the electrical power system.

The first generator-set may comprise: a prime mover having a drive shaft; and a synchronous electrical machine having a rotor mechanically coupled to the drive shaft. The power recovery and regeneration system may be operable to configure, during a starting state of the first generator-set, the synchronous electrical machine electrically coupled to the power recovery and regeneration system and electrically de-coupled from the input node of the first rectifier. At least one of the first and second energy storage devices may comprise a flywheel, the power recovery and regeneration system may comprise a second inverter, a second rectifier, and the flywheel, and the power recovery and regeneration system may be operable to configure, during the starting state of the first generator-set: an input node of the second rectifier coupled to the flywheel, wherein the second rectifier may be operable to convert AC electrical power from the flywheel to DC electrical power that is output to an output node of the second rectifier; the output node of the second rectifier coupled to an input node of the second inverter, wherein the second inverter may be operable to invert DC electrical power received at the input node of the second inverter to AC electrical power that is output to an output node of the second inverter; and the output node of the second inverter coupled to the synchronous electrical machine.

The present disclosure also introduces a method comprising operating a well construction system, wherein the well construction system comprises: motor equipment comprising at least one of: a drawworks motor, a top drive motor, or a combination thereof; and an electrical power system comprising a power recovery and regeneration system, wherein the power recovery and regeneration system comprises at least one energy storage device that is not a capacitor bank. Operating the well construction system comprises: generating AC electrical power that is made available on an AC node; converting AC electrical power available on the AC node to DC electrical power available on a DC node, wherein the motor equipment is configured to consume DC electrical power available on the DC node; storing energy based on DC electrical power available on the DC node by the power recovery and regeneration system; and regenerating the stored energy from the power recovery and regeneration system to AC electrical power, DC electrical power, or a combination thereof for consumption by an electrical consumer of the well construction system.

The at least one energy storage device may comprise a battery, a flywheel, and/or a combination thereof.

The motor equipment may comprise the drawworks motor, an inverter may be electrically coupled to and disposed between the drawworks motor and the first DC node, AC electrical power may be generated by the drawworks motor during at least a portion of operating the well construction system, and the inverter may convert AC electrical power generated by the drawworks motor to DC electrical power that is made available on the first DC node.

The motor equipment may comprise the top drive motor, an inverter may be electrically coupled to and disposed between the top drive motor and the first DC node, AC electrical power may be generated by the top drive motor during at least a portion of operating the well construction system, and the inverter may convert AC electrical power generated by the top drive motor to DC electrical power that is made available on the first DC node.

AC electrical power may be generated by a generator-set during at least a portion of operating the well construction system, the generator-set may comprise an engine prime mover, and operating the well construction system may comprise controlling operation of the engine prime mover while AC electrical power is generated by the generator-set based on emissions of the engine prime mover.

Operating the well construction system may comprise: generating, by a first generator-set, AC electrical power at a first frequency that is made available at the first AC node during at least a portion of operating the well construction system; generating, by a second generator-set, AC electrical power at a second frequency that is made available at a second AC node during at least a portion of generating, by the first generator-set, AC electrical power at the first frequency, wherein the second frequency may be different from the first frequency; and converting AC electrical power available on the second AC node to DC electrical power available on the first DC node.

AC electrical power may be generated by an alternative electrical power generation system coupled to the first AC node. The alternative electrical power generation system may comprise a heat-to-electrical current converter, a solar panel, a wind turbine, and/or combinations thereof.

The at least one energy storage device may comprise a flywheel, and storing energy by the power recovery and regeneration system may comprise inverting DC electrical power available on the first DC node into AC electrical power that is made available to the flywheel.

The at least one energy storage device may comprise a flywheel, the power recovery and regeneration system may comprise a transformer, and storing energy by the power recovery and regeneration system may comprise: inverting DC electrical power available on the first DC node into AC electrical power that is made available to a primary winding of a transformer; and electrically coupling a secondary winding of the transformer to the flywheel. Electrically coupling the secondary winding of the transformer to the flywheel may comprise selectively electrically coupling one of multiple taps of the secondary winding of the transformer to the flywheel.

The at least one energy storage device may comprise a flywheel comprising a plurality of flywheel motors, and storing energy by the power recovery and regeneration system may comprise: selectively configuring the flywheel motors in parallel; and providing AC electrical power to the parallel flywheel motors.

The at least one energy storage device may comprise a flywheel, and regenerating the stored energy from the power recovery and regeneration system may comprise converting AC electrical power from the flywheel to DC electrical energy made available on the first DC node. The flywheel may comprise a plurality of flywheel motors, and regenerating the stored energy from the power recovery and regeneration system may comprise: selectively configuring the flywheel motors in series; and converting AC electrical power from the series flywheel motors.

The at least one energy storage device may comprise a flywheel, and regenerating the stored energy from the power recovery and regeneration system may comprise: converting AC electrical power from the flywheel to DC electrical power made available on a second DC node; and inverting DC electrical power available on the second DC node to AC electrical power that is made available on the first AC node.

The present disclosure also introduces a method comprising operating a well construction system, wherein the well construction system comprises: a generator-set comprising a prime mover and a synchronous electrical machine; an electrical system comprising a power recovery and regeneration system, wherein the power recovery and regeneration system comprises at least one energy storage device that is not a capacitor bank; and an electrical power consumer electrically coupled to the electrical system. Operating the well construction system comprises: storing, in the power recovery and regeneration system, energy distributed in the electrical system; and starting the prime mover, wherein starting the prime mover comprises electrically coupling the power recovery and regeneration system to the synchronous electrical machine.

Operating the well construction system may comprise, after the storing and the starting, operating the prime mover and the synchronous electrical machine as a traditional generator-set.

The at least one energy storage device may comprise a battery, a flywheel, and/or a combination thereof.

The at least one energy storage device may comprise a flywheel, the power recovery and regeneration system may comprise the flywheel, a rectifier, and an inverter, and electrically coupling the power recovery and regeneration system to the synchronous electrical machine may comprise: electrically coupling the flywheel to an input node of the rectifier; electrically coupling an output node of the rectifier to an input node of the inverter; and electrically coupling an output node of the inverter to the synchronous electrical machine.

Operating the well construction system may comprise, after starting the prime mover, electrically coupling the synchronous electrical machine to the electrical system.

Operating the well construction system may comprise generating electrical power by a second generator-set electrically coupled to the electrical system, wherein: the electrical power generated by the second generator-set may be provided to the electrical system; and electrically coupling the power recovery and regeneration system to the synchronous electrical machine may be performed while the electrical power is being generated by the second generator-set.

The present disclosure also introduces an apparatus comprising a well construction system comprising: (A) motor equipment comprising at least one of: a drawworks motor, a top drive motor, or a combination thereof; and (B) an electrical power system comprising: (1) a generator-set operable to generate AC electrical power that is output at a generator node of the generator-set; (2) a rectifier, wherein: (i) an input node of the rectifier is coupled to the generator node during a generation state of the generator-set; (ii) the rectifier is operable to convert AC electrical power received at the input node of the rectifier to DC electrical power that is output to an output node of the rectifier; and (iii) the output node of the rectifier is coupled to a DC node; (3) at least one inverter electrically coupled between the DC node and the motor equipment, wherein the at least one inverter is operable to: (i) invert DC electrical power received from the DC node to AC electrical power that is provided to the motor equipment; and (ii) convert AC electrical power generated by the motor equipment to DC electrical power that is provided to the DC node; and (4) a power recovery and regeneration system electrically coupled to the DC node during a recovery state and during a regeneration state, wherein the power recovery and regeneration system comprises a first energy storage device and a second energy storage device, wherein the first energy storage device is connected in parallel with the second energy storage device during a charge state, wherein the first energy storage device is connected in series with the second energy storage device during a discharge state, and wherein each of the first and second energy storage devices comprises at least one of a capacitor bank, a battery, and a flywheel.

The motor equipment may comprise the drawworks motor and the top drive motor, the at least one inverter may comprise a drawworks inverter and a top drive inverter, the drawworks inverter may be coupled between the DC node and the drawworks motor, and the top drive inverter may be coupled between the DC node and the top drive motor.

The generator node may be coupled to an AC node, the well construction system may comprise a drilling fluid pump and a small load, an electrical system of the drilling fluid pump may be coupled to the AC node, and an electrical system of the small load may be coupled to the AC node.

The generator node may be coupled to an AC node, and the electrical power system may comprise an alternative electrical power generation system coupled to the AC node. The alternative electrical power generation system may comprise a heat-to-electrical current converter, a solar panel, a wind turbine, and/or combinations thereof.

The power recovery and regeneration system may comprise the capacitor bank and the flywheel. The first energy storage device may comprise a first capacitor and the second energy storage device may comprise a second capacitor. The first capacitor may be electrically isolated from the second capacitor during an adjustment state to the first capacitor, and the second capacitor may be electrically isolated from the first capacitor during an adjustment state to the second capacitor. The first energy storage device may comprise a first flywheel motor and the second energy storage device may comprise a second flywheel motor.

The power recovery and regeneration system may comprise the battery and the flywheel. The first energy storage device may comprise a first battery and the second energy storage device may comprise a second battery. The first battery may be electrically isolated from the second battery during an adjustment state to the first battery, and the second battery may be electrically isolated from the first battery during an adjustment state to the second battery.

The first energy storage device may comprise a first flywheel motor and the second energy storage device may comprise a second flywheel motor.

The power recovery and regeneration system may comprise a second DC node, a second rectifier having an output node coupled to the second DC node, a second inverter having an input node coupled to the second DC node, and the flywheel, and the power recovery and regeneration system may be operable to configure, during the first recovery state: the second DC node electrically coupled to the first DC node; and an output node of the second inverter electrically coupled to the flywheel, wherein the second inverter may be operable to invert DC electrical power available on the second DC node to AC electrical power that is provided to the flywheel. The power recovery and regeneration system may also be operable to configure, during the first regeneration state: the second DC node electrically coupled to the first DC node; and an input node of the second rectifier electrically coupled to the flywheel, wherein the second rectifier may be operable to convert AC electrical power from the flywheel to DC electrical power that is provided to the second DC node. The first generator node may be coupled to an AC node, the input node of the first rectifier may be coupled to the AC node, an AC electrical power consumer may be coupled to the AC node, and the power recovery and regeneration system may be operable to configure, during the first regeneration state, the output node of the second inverter electrically coupled to the AC node. The first generator node may be coupled to an AC node, the input node of the first rectifier may be coupled to the AC node, an AC electrical power consumer may be coupled to the AC node, and the power recovery and regeneration system may be operable to configure, during a second regeneration state: the second DC node electrically de-coupled from the first DC node; the input node of the second rectifier electrically coupled to the flywheel, wherein the second rectifier may be operable to convert AC electrical power from the flywheel to DC electrical power that is provided to the second DC node; and the output node of the second inverter electrically coupled to the AC node, wherein the second inverter may be operable to invert the DC electrical power available on the second DC node to AC electrical power that is provided to the AC node. The power recovery and regeneration system may comprise the capacitor bank and a chopper, wherein: the chopper may be coupled to and disposed between the second DC node and the capacitor bank; and the chopper may be operable to selectively electrically couple and de-couple the capacitor bank or part of the capacitor bank or even to interconnect part of the capacitor bank in series to and from, respectively, the second DC node. The power recovery and regeneration system may be operable to configure, during a first balancing state: the second DC node electrically de-coupled from the first DC node; the chopper selectively coupling the capacitor bank to the second DC node to transfer DC electrical power from the capacitor bank to the second DC node; and the output node of the second inverter electrically coupled to the flywheel, wherein the second inverter may be operable to invert DC electrical power available on the second DC node to AC electrical power that is provided to the flywheel. The power recovery and regeneration system may be operable to configure, during a second balancing state: the second DC node electrically de-coupled from the first DC node; the input node of the second rectifier electrically coupled to the flywheel, wherein the second rectifier may be operable to convert AC electrical power from the flywheel to DC electrical power that is provided to the second DC node; and the chopper selectively coupling the capacitor bank to the second DC node to transfer DC electrical power available on the second DC node to the capacitor bank.

The power recovery and regeneration system may comprise the flywheel operatively connected with the motor equipment, and the inverter may be operable to increase frequency of the AC electrical power that is provided to the motor equipment to increase the rotational speed of the flywheel and thus increase amount of energy stored by the flywheel.

The power recovery and regeneration system may comprise: a second DC node; a second inverter having an input node coupled to the second DC node; a third DC node; a second rectifier having an output node coupled to the third DC node; a transformer; and the flywheel. The power recovery and regeneration system may be operable to configure, during the first recovery state: the second DC node electrically coupled to the first DC node; an output node of the second inverter electrically coupled to a primary winding of the transformer, wherein the second inverter may be operable to invert DC electrical power available on the second DC node to AC electrical power that is provided to the primary winding of the transformer; and a secondary winding of the transformer electrically coupled to the flywheel. The power recovery and regeneration system may also be operable to configure, during the first regeneration state: the second DC node electrically coupled to the first DC node; the third DC node electrically coupled to the second DC node; and an input node of the second rectifier electrically coupled to the flywheel, wherein the second rectifier may be operable to convert AC electrical power from the flywheel to DC electrical power that is provided to the third DC node. The transformer may have multiple taps on the secondary winding, each of the multiple taps may have a different ratio of number of windings of the primary winding to number of windings of the secondary winding, and the power recovery and regeneration system may be operable to, during the first recovery state, selectively couple one of the multiple taps of the secondary winding to the flywheel. The first generator node may be coupled to an AC node, the input node of the first rectifier may be coupled to the AC node, an AC electrical power consumer may be coupled to the AC node, and the power recovery and regeneration system may be operable to configure, during the first regeneration state, the output node of the second inverter electrically coupled to the AC node. The first generator node may be coupled to an AC node, the input node of the first rectifier may be coupled to the AC node, an AC electrical power consumer may be coupled to the AC node, and the power recovery and regeneration system may be operable to configure, during a second regeneration state: the second DC node electrically de-coupled from the first DC node; the third DC node electrically coupled to the second DC node; the input node of the second rectifier electrically coupled to the flywheel, wherein the second rectifier may be operable to convert AC electrical power from the flywheel to DC electrical power that is provided to the third DC node; and the output node of the second inverter electrically coupled to the AC node, wherein the second inverter may be operable to invert the DC electrical power available on the second DC node to AC electrical power that is provided to the AC node.

The power recovery and regeneration system may comprise the capacitor bank and a chopper, wherein: the chopper may be coupled to and disposed between the third DC node and the capacitor bank; and the chopper may be operable to selectively electrically couple and de-couple the capacitor bank to and from, respectively, the third DC node. The power recovery and regeneration system may be operable to configure, during a first balancing state: the second DC node electrically de-coupled from the first DC node; the third DC node electrically coupled to the second DC node; the chopper selectively coupling the capacitor bank to the third DC node to transfer DC electrical power from the capacitor bank to the third DC node; the output node of the second inverter electrically coupled to the primary winding of the transformer, wherein the second inverter may be operable to invert DC electrical power available on the second DC node to AC electrical power that is provided to the primary winding; and the secondary winding of the transformer electrically coupled to the flywheel. The power recovery and regeneration system may also b e operable to configure, during a second balancing state: (A) at least one of: (1) the second DC node electrically de-coupled from the first DC node; (2) the third DC node electrically de-coupled from the second DC node; or (3) a combination thereof; (B) the input node of the second rectifier electrically coupled to the flywheel, wherein the second rectifier may be operable to convert AC electrical power from the flywheel to DC electrical power that is provided to the third DC node; and (C) the chopper selectively coupling the capacitor bank to the third DC node to transfer DC electrical power available on the third DC node to the capacitor bank. The power recovery and regeneration system may be operable to configure, during a second recovery state: the second DC node electrically coupled to the first DC node; the third DC node electrically de-coupled from the second DC node; the output node of the second inverter electrically coupled to the primary winding of the transformer, wherein the second inverter may be operable to invert DC electrical power available on the second DC node to AC electrical power that is provided to the primary winding of the transformer; the secondary winding of the transformer electrically coupled to the input node of the second rectifier, wherein the second rectifier may be operable to convert AC electrical power from the secondary winding of the transformer to DC electrical power that is provided to the third DC node; and the chopper selectively coupling the capacitor bank to the third DC node. The transformer may have multiple taps on the secondary winding, each of the multiple taps may have a different ratio of number of windings of the primary winding to number of windings of the secondary winding, and the power recovery and regeneration system may be operable to, during the second recovery state, selectively couple one of the multiple taps of the secondary winding to the input node of the second rectifier.

The electrical power system may comprise: a second generator-set operable to generate AC electrical power that is output at a second generator node of the second generator-set; and a second rectifier. An input node of the second rectifier may be coupled to the second generator node during a generation state of the second generator-set, the second rectifier may be operable to convert AC electrical power received at the input node of the second rectifier to DC electrical power that is output to an output node of the second rectifier, and the output node of the second rectifier may be coupled to the first DC node. The first generator-set and the second generator-set may be operable to generate AC electrical power at different frequencies when the first generator-set and the second generator-set are generating AC electrical power input to the electrical power system.

The generator-set may comprise: a prime mover having a drive shaft; and a synchronous electrical machine having a rotor mechanically coupled to the drive shaft. The power recovery and regeneration system may be operable to configure, during a starting state of the generator-set, the synchronous electrical machine electrically coupled to the power recovery and regeneration system and electrically de-coupled from the input node of the rectifier. The power recovery and regeneration system may comprise a second inverter, a second rectifier, and the flywheel, and the power recovery and regeneration system may be operable to configure, during the starting state of the generator-set: an input node of the second rectifier coupled to the flywheel, wherein the second rectifier may be operable to convert AC electrical power from the flywheel to DC electrical power that is output to an output node of the second rectifier; the output node of the second rectifier coupled to an input node of the second inverter, wherein the second inverter may be operable to invert DC electrical power received at the input node of the second inverter to AC electrical power that is output to an output node of the second inverter; and the output node of the second inverter coupled to the synchronous electrical machine. The power recovery and regeneration system may comprise a second inverter and the capacitor bank, and the power recovery and regeneration system may be operable to configure, during the starting state of the generator-set: the capacitor bank coupled to an input node of the second inverter, wherein the second inverter may be operable to invert DC electrical power received at the input node of the second inverter to AC electrical power that is output to an output node of the second inverter; and the output node of the second inverter coupled to the synchronous electrical machine.

The present disclosure also introduces a method comprising operating a well construction system, wherein the well construction system comprises: motor equipment comprising at least one of: a drawworks motor, a top drive motor, or a combination thereof; and an electrical power system comprising a power recovery and regeneration system, wherein the power recovery and regeneration system comprises at least one of: a capacitor bank, a flywheel, or a combination thereof. Operating the well construction system comprises: generating AC electrical power that is made available on an AC node; converting AC electrical power available on the AC node to DC electrical power available on a DC node, wherein the motor equipment is configured to consume DC electrical power available on the DC node; storing energy based on DC electrical power available on the DC node by the power recovery and regeneration system; and regenerating the stored energy from the power recovery and regeneration system to AC electrical power, DC electrical power, or a combination thereof for consumption by an electrical consumer of the well construction system.

The motor equipment may comprise the drawworks motor, an inverter may be electrically coupled to and disposed between the drawworks motor and the DC node, AC electrical power may be generated by the drawworks motor during at least a portion of operating the well construction system, and the inverter may convert AC electrical power generated by the drawworks motor to DC electrical power that is made available on the DC node.

The motor equipment may comprise the top drive motor, an inverter may be electrically coupled to and disposed between the top drive motor and the DC node, AC electrical power may be generated by the top drive motor during at least a portion of operating the well construction system, and the inverter may convert AC electrical power generated by the top drive motor to DC electrical power that is made available on the DC node.

AC electrical power may be generated by a generator-set during at least a portion of operating the well construction system, the generator-set may comprise an engine prime mover, and operating the well construction system may comprise controlling operation of the engine prime mover while AC electrical power is generated by the generator-set based on emissions of the engine prime mover.

Operating the well construction system may comprise: generating, by a first generator-set, AC electrical power at a first frequency that is made available at the first AC node during at least a portion of operating the well construction system; generating, by a second generator-set, AC electrical power at a second frequency that is made available at a second AC node during at least a portion of generating, by the first generator-set, AC electrical power at the first frequency, wherein the second frequency may be different from the first frequency; and converting AC electrical power available on the second AC node to DC electrical power available on the first DC node.

AC electrical power may be generated by an alternative electrical power generation system coupled to the first AC node. The alternative electrical power generation system may comprise a heat-to-electrical current converter, a solar panel, a wind turbine, and/or combinations thereof.

The power recovery and regeneration system may comprise the flywheel, and storing energy by the power recovery and regeneration system may comprise inverting DC electrical power available on the first DC node into AC electrical power that is made available to the flywheel.

The power recovery and regeneration system may comprise the flywheel and a transformer, and storing energy by the power recovery and regeneration system may comprise: inverting DC electrical power available on the first DC node into AC electrical power that is made available to a primary winding of a transformer; and electrically coupling a secondary winding of the transformer to the flywheel. Electrically coupling the secondary winding of the transformer to the flywheel may comprise selectively electrically coupling one of multiple taps of the secondary winding of the transformer to the flywheel.

The power recovery and regeneration system may comprise the capacitor bank, and storing energy by the power recovery and regeneration system may comprise electrically coupling the capacitor bank to the first DC node.

The power recovery and regeneration system may comprise the capacitor bank and a transformer, and storing energy by the power recovery and regeneration system may comprise: inverting DC electrical power available on the first DC node into AC electrical power that is made available to a primary winding of a transformer; converting AC electrical power available on a secondary winding of the transformer to DC electrical power that is made available on a second DC node; and electrically coupling the capacitor bank to the second DC node. Converting AC electrical power available on the secondary winding of the transformer may comprise converting AC electrical power available on a selected one of multiple taps of the secondary winding of the transformer.

The power recovery and regeneration system may comprise the capacitor bank comprising a plurality of capacitors, and operating the well construction system may comprise adjusting respective voltages of the capacitors.

The power recovery and regeneration system may comprise the capacitor bank comprising a plurality of capacitors, and storing energy by the power recovery and regeneration system may comprise: selectively configuring the capacitors in parallel; and electrically coupling the parallel capacitors to the first DC node.

The power recovery and regeneration system may comprise the flywheel comprising a plurality of flywheel motors, and storing energy by the power recovery and regeneration system may comprise: selectively configuring the flywheel motors in parallel; and providing AC electrical power to the parallel flywheel motors.

The power recovery and regeneration system may comprise the flywheel, and regenerating the stored energy from the power recovery and regeneration system may comprise converting AC electrical power from the flywheel to DC electrical energy made available on the first DC node. The flywheel may comprise a plurality of flywheel motors, and regenerating the stored energy from the power recovery and regeneration system may comprise: selectively configuring the flywheel motors in series; and converting AC electrical power from the series flywheel motors.

The power recovery and regeneration system may comprise the capacitor bank, and regenerating the stored energy from the power recovery and regeneration system may comprise electrically coupling the capacitor bank to the first DC node. The capacitor bank may comprise a plurality of capacitors, and electrically coupling the capacitor bank to the first DC node may comprise: selectively configuring the capacitors in series; and electrically coupling the series capacitors to the first DC node.

The power recovery and regeneration system may comprise the flywheel, and regenerating the stored energy from the power recovery and regeneration system may comprise: converting AC electrical power from the flywheel to DC electrical power made available on a second DC node; and inverting DC electrical power available on the second DC node to AC electrical power that is made available on the first AC node.

The power recovery and regeneration system may comprise the capacitor bank, and regenerating the stored energy from the power recovery and regeneration system may comprise: electrically coupling the capacitor bank to a second DC node; and inverting DC electrical power available on the second DC node to AC electrical power that is made available on the first AC node.

The present disclosure also introduces a method comprising operating a well construction system, wherein the well construction system comprises: a generator-set comprising a prime mover and a synchronous electrical machine; an electrical system comprising a power recovery and regeneration system, wherein the power recovery and regeneration system comprises at least one of: a capacitor bank, a flywheel, or a combination thereof; and an electrical power consumer electrically coupled to the electrical system. Operating the well construction system comprises: storing, in the power recovery and regeneration system, energy distributed in the electrical system; and starting the prime mover, wherein starting the prime mover comprises electrically coupling the power recovery and regeneration system to the synchronous electrical machine. Operating the well construction system may thereafter comprise operating the prime mover and the synchronous electrical machine as a normal generator-set.

The power recovery and regeneration system may comprise the flywheel in which energy is stored, a rectifier, and an inverter, and electrically coupling the power recovery and regeneration system to the synchronous electrical machine may comprise: electrically coupling the flywheel to an input node of the rectifier; electrically coupling an output node of the rectifier to an input node of the inverter; and electrically coupling an output node of the inverter to the synchronous electrical machine.

The power recovery and regeneration system may comprise the capacitor bank in which energy is stored, and an inverter. Electrically coupling the power recovery and regeneration system to the synchronous electrical machine may comprise: electrically coupling the capacitor bank to an input node of the inverter; and electrically coupling an output node of the inverter to the synchronous electrical machine.

Operating the well construction system may comprise, after starting the prime mover, electrically coupling the synchronous electrical machine to the electrical system.

Operating the well construction system may comprise generating electrical power by a second generator-set electrically coupled to the electrical system, the electrical power generated by the second generator-set may be provided to the electrical system, and electrically coupling the power recovery and regeneration system to the synchronous electrical machine may be performed while the electrical power is being generated by the second generator-set.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
a well construction system comprising:
motor equipment comprising at least one of: a drawworks motor, a top drive motor, or a combination thereof; and
an electrical power system comprising:
a generator-set operable to generate AC electrical power that is output at a generator node of the generator-set;
a rectifier, wherein:
an input node of the rectifier is coupled to the generator node during a generation state of the generator-set;
the rectifier is operable to convert AC electrical power received at the input node of the rectifier to DC electrical power that is output to an output node of the rectifier; and
the output node of the rectifier is coupled to a DC node;
at least one inverter electrically coupled between the DC node and the motor equipment, wherein the at least one inverter is operable to:
invert DC electrical power received from the DC node to AC electrical power that is provided to the motor equipment; and
convert AC electrical power generated by the motor equipment to DC electrical power that is provided to the DC node; and
a power recovery and regeneration system electrically coupled to the DC node during a recovery state and during a regeneration state, wherein the power recovery and regeneration system comprises a first energy storage device and a second energy storage device, wherein the first energy storage device is connected in parallel with the second energy storage device during a charge state, wherein the first energy storage device is connected in series with the second energy storage device during a discharge state, and wherein at least one of the first and second energy storage devices does not comprise a capacitor bank.

2. The apparatus of claim 1 wherein at least one of the first and second energy storage devices comprises a battery.

3. The apparatus of claim 1 wherein at least one of the first and second energy storage devices comprises a flywheel.

4. The apparatus of claim 1 wherein:
the motor equipment comprises the drawworks motor and the top drive motor;
the at least one inverter comprises a drawworks inverter and a top drive inverter;
the drawworks inverter is coupled between the DC node and the drawworks motor; and
the top drive inverter is coupled between the DC node and the top drive motor.

5. The apparatus of claim 1 wherein:
the generator node is coupled to an AC node;
the well construction system further comprises a drilling fluid pump and a small load;
an electrical system of the drilling fluid pump is coupled to the AC node; and
an electrical system of the small load is coupled to the AC node.

6. The apparatus of claim 1 wherein:
the generator node is coupled to an AC node; and
the electrical power system further comprises an alternative electrical power generation system coupled to the AC node, wherein the alternative electrical power generation system comprises at least one of a heat-to-electrical current converter, a solar panel, and/or a wind turbine.

7. The apparatus of claim 1 wherein at least one of the first and second energy storage devices is a flywheel operatively connected with the motor equipment, and wherein the at least one inverter is operable to increase frequency of the AC electrical power that is provided to the motor equipment to increase the rotational speed of the flywheel and thus increase amount of energy stored by the flywheel.

8. The apparatus of claim 1 wherein:
the DC node is a first DC node, the rectifier is a first rectifier, and the at least one inverter is at least one first inverter;
the power recovery and regeneration system comprises:
a second DC node;
a second rectifier having an output node coupled to the second DC node; and
a second inverter having an input node coupled to the second DC node, wherein one of the first and second energy storage devices comprises a flywheel;
the power recovery and regeneration system is operable to configure, during the recovery state:
the second DC node electrically coupled to the first DC node; and
an output node of the second inverter electrically coupled to the flywheel, wherein the second inverter is operable to invert DC electrical power available on the second DC node to AC electrical power that is provided to the flywheel; and
the power recovery and regeneration system is operable to configure, during the regeneration state:
the second DC node electrically coupled to the first DC node; and
an input node of the second rectifier electrically coupled to the flywheel, wherein the second rectifier is operable to convert AC electrical power from the flywheel to DC electrical power that is provided to the second DC node.

9. The apparatus of claim 1 wherein:
the generator-set comprises:
a prime mover having a drive shaft; and
a synchronous electrical machine having a rotor mechanically coupled to the drive shaft; and
the power recovery and regeneration system is operable to configure, during a starting state of the generator-set, the synchronous electrical machine electrically coupled to the power recovery and regeneration system and electrically de-coupled from the input node of the rectifier.

10. The apparatus of claim 1 wherein:
the DC node is a first DC node;
the at least one inverter is at least one first inverter;
the rectifier is a first rectifier;
the power recovery and regeneration system comprises:
a second DC node;
a second inverter having an input node coupled to the second DC node;
a third DC node;
a second rectifier having an output node coupled to the third DC node; and
a transformer, wherein at least one of the first and second energy storage devices is a flywheel;
the power recovery and regeneration system is operable to configure, during the recovery state:
the second DC node electrically coupled to the first DC node;
an output node of the second inverter electrically coupled to a primary winding of the transformer, wherein the second inverter is operable to invert DC electrical power available on the second DC node to AC electrical power that is provided to the primary winding of the transformer; and
a secondary winding of the transformer electrically coupled to the flywheel;
the power recovery and regeneration system is operable to configure, during the regeneration state:
the second DC node electrically coupled to the first DC node;
the third DC node electrically coupled to the second DC node; and
an input node of the second rectifier electrically coupled to the flywheel, wherein the second rectifier is operable to convert AC electrical power from the flywheel to DC electrical power that is provided to the third DC node.

11. The apparatus of claim 1 wherein:
the generator-set is a first generator-set;
the generator node is a first generator node;
the electrical power system comprises:
a second generator-set operable to generate AC electrical power that is output at a second generator node of the second generator-set; and
a second rectifier;
an input node of the second rectifier is coupled to the second generator node during a generation state of the second generator-set;
the second rectifier is operable to convert AC electrical power received at the input node of the second rectifier to DC electrical power that is output to an output node of the second rectifier; and
the output node of the second rectifier is coupled to the DC node.

12. A method comprising:
operating a well construction system, wherein:
the well construction system comprises:
motor equipment comprising at least one of a drawworks motor, a top drive motor, and/or a combination thereof; and
an electrical power system comprising a power recovery and regeneration system, wherein the power recovery and regeneration system comprises at least one
energy storage device that is not a capacitor bank; and
operating the well construction system comprises:
generating AC electrical power that is made available on an AC node;
converting AC electrical power available on the AC node to DC electrical power available on a DC node, wherein the motor equipment is configured to consume DC electrical power available on the DC node;
inverting AC electrical power generated by the motor equipment to DC electrical power that is provided to the DC node;
storing energy based on DC electrical power available on the DC node by the power recovery and regeneration system; and
regenerating the stored energy from the power recovery and regeneration system to AC electrical power, DC electrical power, or a combination thereof for consumption by an electrical consumer of the well construction system.

13. The method of claim 12 wherein the AC node is a first AC node, and wherein operating the well construction system further comprises:
generating, by a first generator-set, AC electrical power at a first frequency that is made available at the first AC node during at least a portion of operating the well construction system;

generating, by a second generator-set, AC electrical power at a second frequency that is made available at a second AC node during at least a portion of generating, by the first generator-set, AC electrical power at the first frequency, wherein the second frequency is different from the first frequency; and converting AC electrical power available on the second AC node to DC electrical power available on the DC node.

14. The method of claim 12 wherein:

the at least one energy storage device comprises a flywheel; and storing energy by the power recovery and regeneration system comprises inverting DC electrical power available on the DC node into AC electrical power that is made available to the flywheel.

15. The method of claim 12 wherein:

the at least one energy storage device comprises a flywheel; and regenerating the stored energy from the power recovery and regeneration system comprises converting AC electrical power from the flywheel to DC electrical energy made available on the DC node.

16. The method of claim 12 wherein:

the DC node is a first DC node;

the at least one energy storage device comprises a flywheel; and regenerating the stored energy from the power recovery and regeneration system comprises:

converting AC electrical power from the flywheel to DC electrical power made available on a second DC node; and inverting DC electrical power available on the second DC node to AC electrical power that is made available on the AC node.

17. A method comprising:

operating a well construction system, wherein:

the well construction system comprises:

a generator-set comprising a prime mover and a synchronous electrical machine;

an electrical system comprising a power recovery and regeneration system, wherein the power recovery and regeneration system comprises at least one energy storage device that is not a capacitor bank; and an electrical power consumer electrically coupled to the electrical system; and operating the well construction system comprises:

storing, in the power recovery and regeneration system, energy distributed in the electrical system; and starting the prime mover, including electrically coupling the power recovery and regeneration system to the synchronous electrical machine, wherein:

the at least one energy storage device comprises a flywheel;

the power recovery and regeneration system comprises a rectifier and an inverter, electrically coupling the power recovery and regeneration system to the synchronous electrical machine comprises:

electrically coupling the flywheel to an input node of the rectifier;

electrically coupling an output node of the rectifier to an input node of the inverter; and electrically coupling an output node of the inverter to the synchronous electrical machine; and starting the prime mover further includes rotating a rotor of the prime mover by the synchronous electrical machine, the synchronous electrical machine receiving AC power from the output node of the inverter.

18. The method of claim 17 wherein:

the generator-set is a first generator-set;

operating the well construction system comprises generating electrical power by a second generator-set electrically coupled to the electrical system;

electrical power generated by the second generator-set is provided to the electrical system; and electrically coupling the power recovery and regeneration system to the synchronous electrical machine is performed while electrical power is being generated by the second generator-set.

19. The method of claim 17 wherein operating the well construction system comprises, after starting the prime mover, electrically coupling the synchronous electrical machine to the electrical system.

* * * * *